(12) United States Patent
Naito

(10) Patent No.: US 10,972,617 B2
(45) Date of Patent: Apr. 6, 2021

(54) INFORMATION TERMINAL CONFIGURED TO TRANSMIT DATA WITH USE OF WIRELESS COMMUNICATION, IMAGE PROCESSING APPARATUS, IMAGE PROCESSING SYSTEM, AND STORAGE MEDIUM

(71) Applicant: CANON KABUSHIKI KAISHA, Tokyo (JP)

(72) Inventor: Yosui Naito, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/549,648

(22) Filed: Aug. 23, 2019

(65) Prior Publication Data

US 2019/0387109 A1 Dec. 19, 2019

Related U.S. Application Data

(63) Continuation of application No. 15/451,213, filed on Mar. 6, 2017, now Pat. No. 10,447,870.

(30) Foreign Application Priority Data

Mar. 11, 2016 (JP) .............................. JP2016-048340

(51) Int. Cl.
*H04N 1/00* (2006.01)
*H04W 4/80* (2018.01)
(Continued)

(52) U.S. Cl.
CPC ......... *H04N 1/00228* (2013.01); *H04L 51/22* (2013.01); *H04N 1/00307* (2013.01);
(Continued)

(58) Field of Classification Search
None
See application file for complete search history.

(56) References Cited

U.S. PATENT DOCUMENTS

| 2005/0054342 A1* | 3/2005 | Otsuka ................. H04W 76/11 455/426.2 |
| 2005/0054352 A1 | 3/2005 | Karaizman |

(Continued)

FOREIGN PATENT DOCUMENTS

| CN | 103297646 A | 9/2013 |
| CN | 103795882 A | 5/2014 |

(Continued)

*Primary Examiner* — Miya J Williams
(74) *Attorney, Agent, or Firm* — Canon U.S.A., Inc. I.P. Division

(57) ABSTRACT

An information terminal transmits information relating to user authentication to an image processing apparatus via short-range wireless communication. The image processing apparatus performs processing for the user authentication using the received information, and transitions to a status where a function of the image processing apparatus is used via an operation unit upon condition that the user authentication has succeeded. The information terminal transmits data to be used in any one of individual functions included in the image processing apparatus to the image processing apparatus based on receipt of information indicating successful user authentication from the image processing apparatus. After receiving the data from the information terminal, the image processing apparatus uses the received data as a setting of the function of the image processing apparatus that corresponds to the data.

24 Claims, 22 Drawing Sheets

(51) Int. Cl.
  *H04N 1/32* (2006.01)
  *H04W 12/06* (2021.01)
  *H04W 12/00* (2021.01)
  *H04L 12/58* (2006.01)
  *H04N 1/44* (2006.01)
  *H04W 36/14* (2009.01)
  *H04W 84/12* (2009.01)
  *H04W 88/02* (2009.01)

(52) U.S. Cl.
  CPC ..... *H04N 1/00315* (2013.01); *H04N 1/32117* (2013.01); *H04N 1/4426* (2013.01); *H04N 1/4433* (2013.01); *H04W 4/80* (2018.02); *H04W 12/003* (2019.01); *H04W 12/06* (2013.01); *H04W 36/14* (2013.01); *H04N 2201/0041* (2013.01); *H04N 2201/0055* (2013.01); *H04N 2201/0094* (2013.01); *H04W 12/00503* (2019.01); *H04W 84/12* (2013.01); *H04W 88/02* (2013.01)

(56) References Cited

U.S. PATENT DOCUMENTS

| | | | |
|---|---|---|---|
| 2009/0036056 A1* | 2/2009 | Oshima | H04M 1/7253 455/41.3 |
| 2013/0258381 A1* | 10/2013 | Sato | H04N 1/001 358/1.13 |
| 2016/0286056 A1* | 9/2016 | Sasase | H04N 1/00103 |

FOREIGN PATENT DOCUMENTS

| | | |
|---|---|---|
| CN | 103973935 A | 8/2014 |
| JP | 2009-037566 A | 2/2009 |
| JP | 2013-180480 A | 9/2013 |
| JP | 2015-069458 A | 4/2015 |
| JP | 2015-104077 A | 6/2015 |
| JP | 2015-228111 A | 12/2015 |
| JP | 2016-021654 A | 2/2016 |

\* cited by examiner

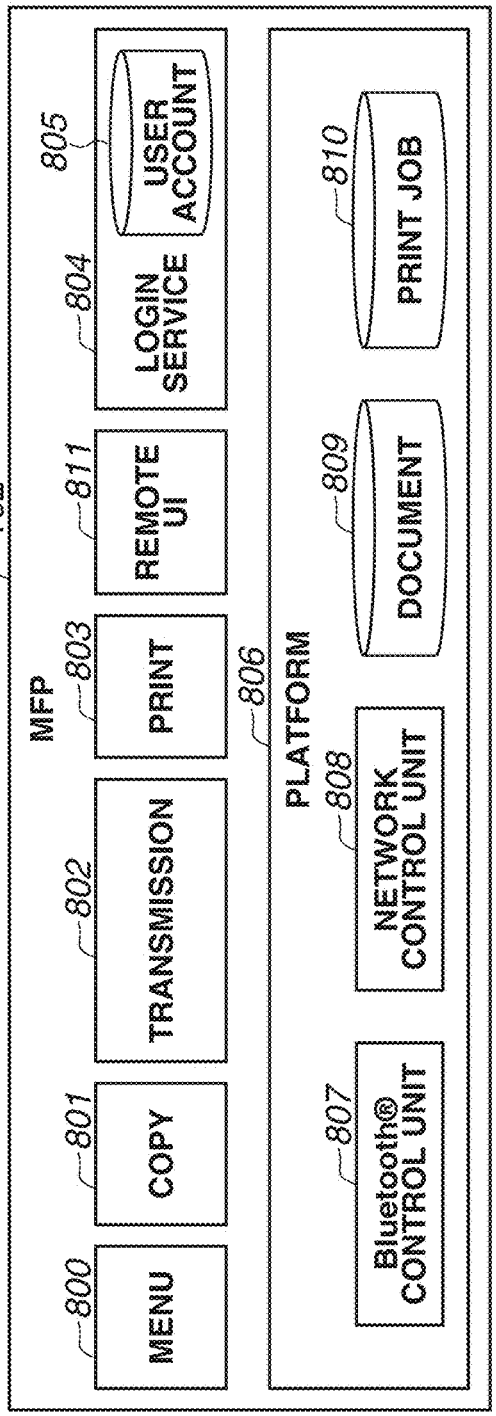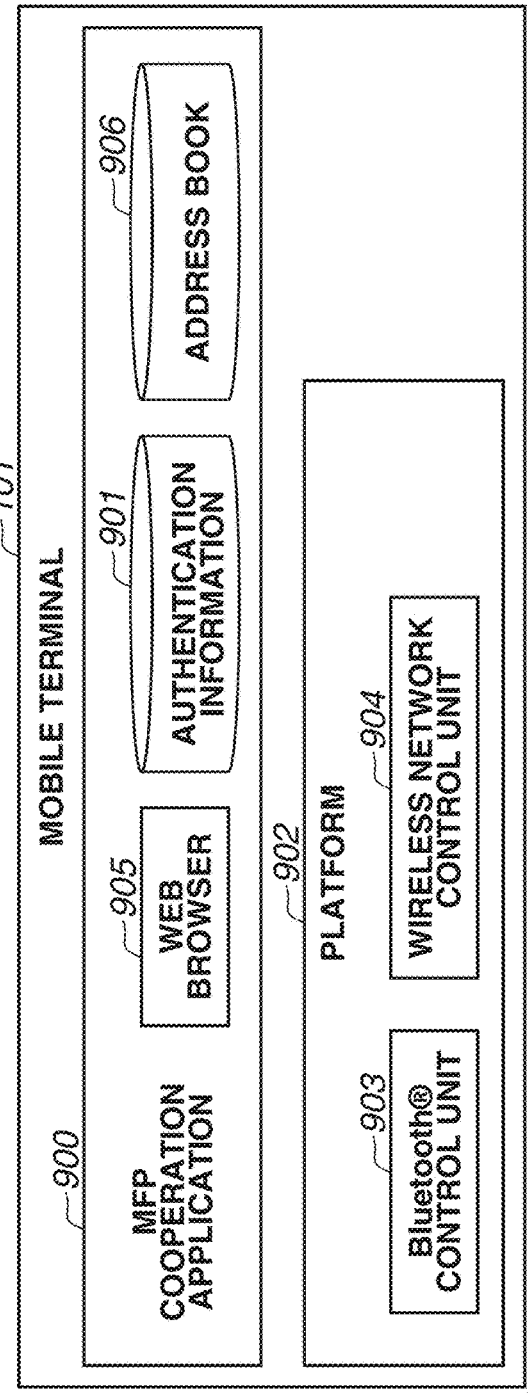

FIG.14
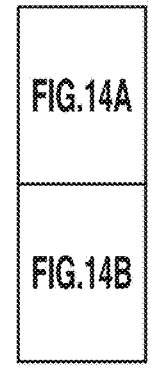
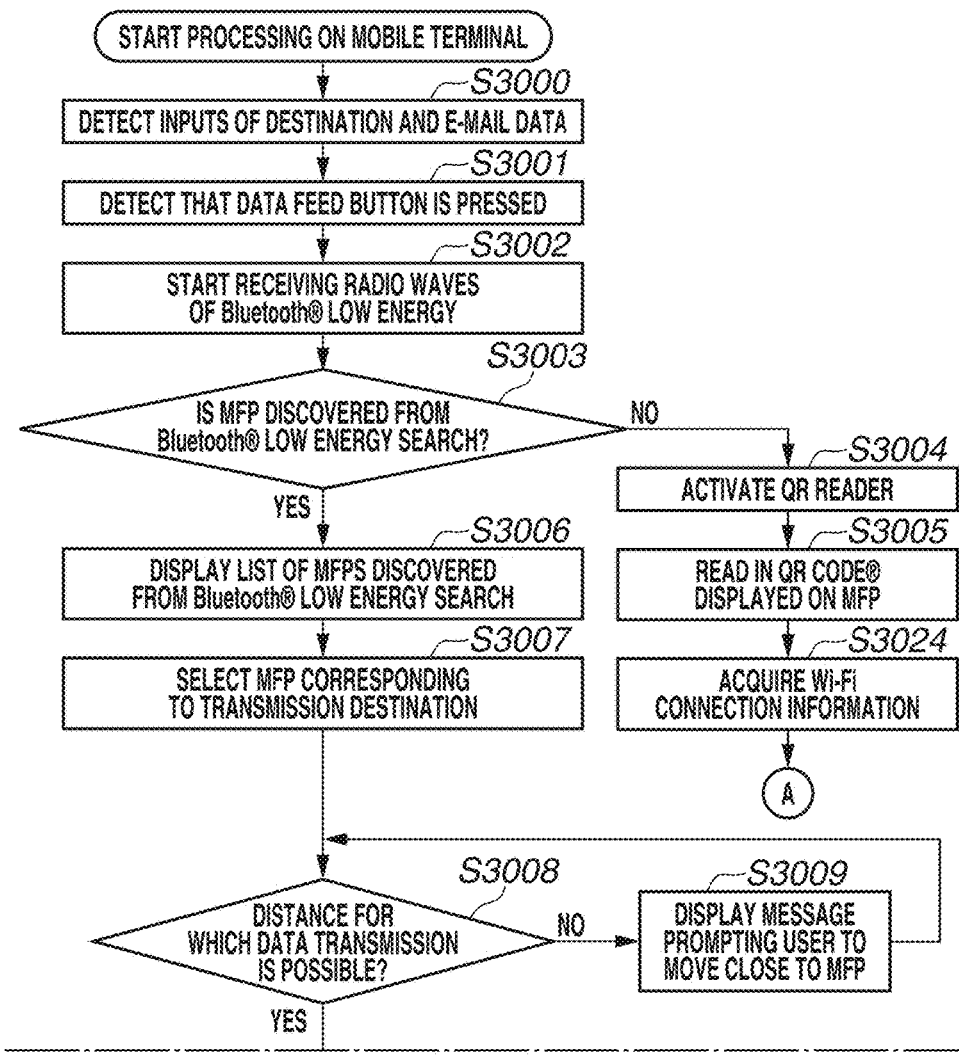
FIG.14A

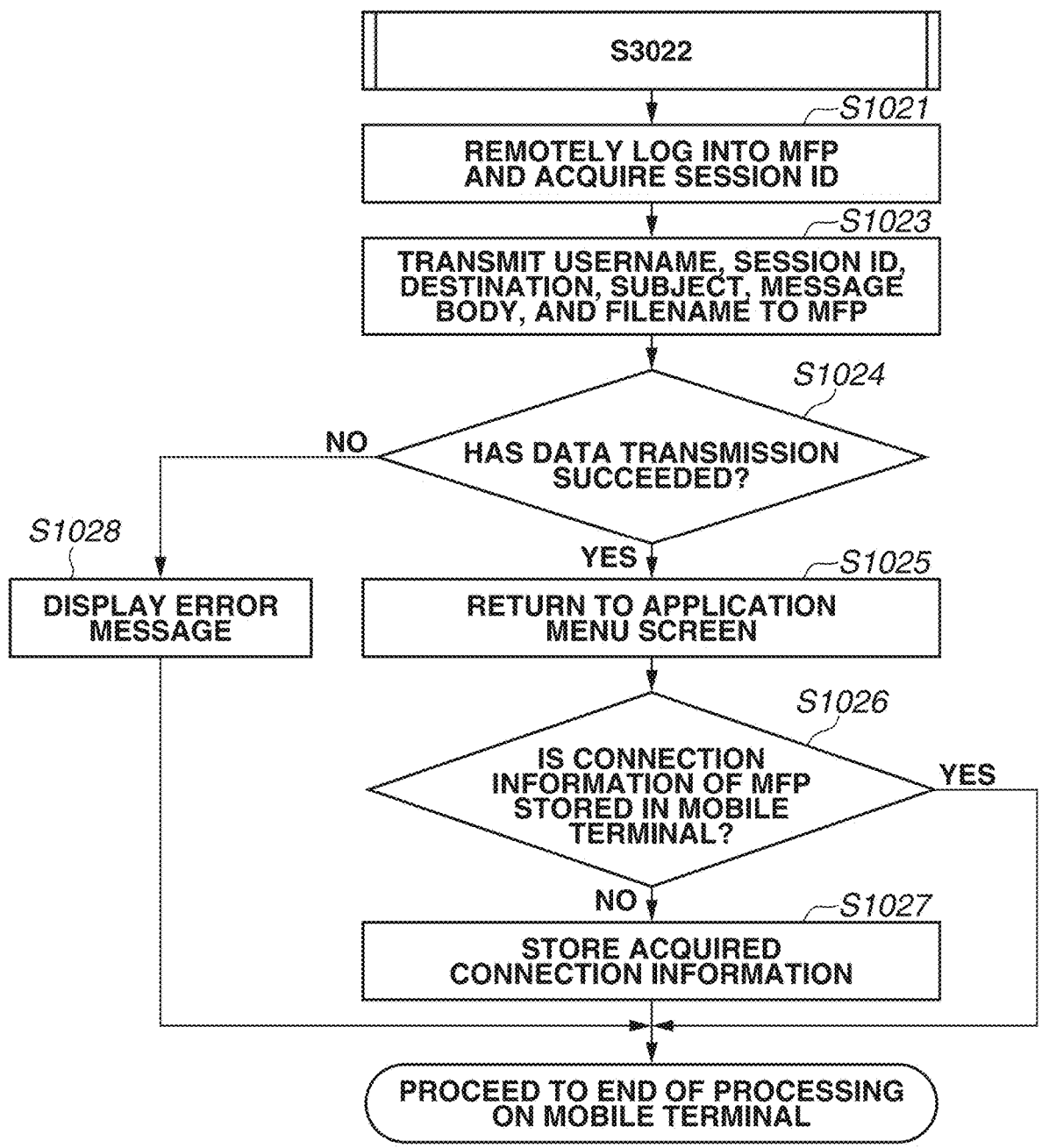

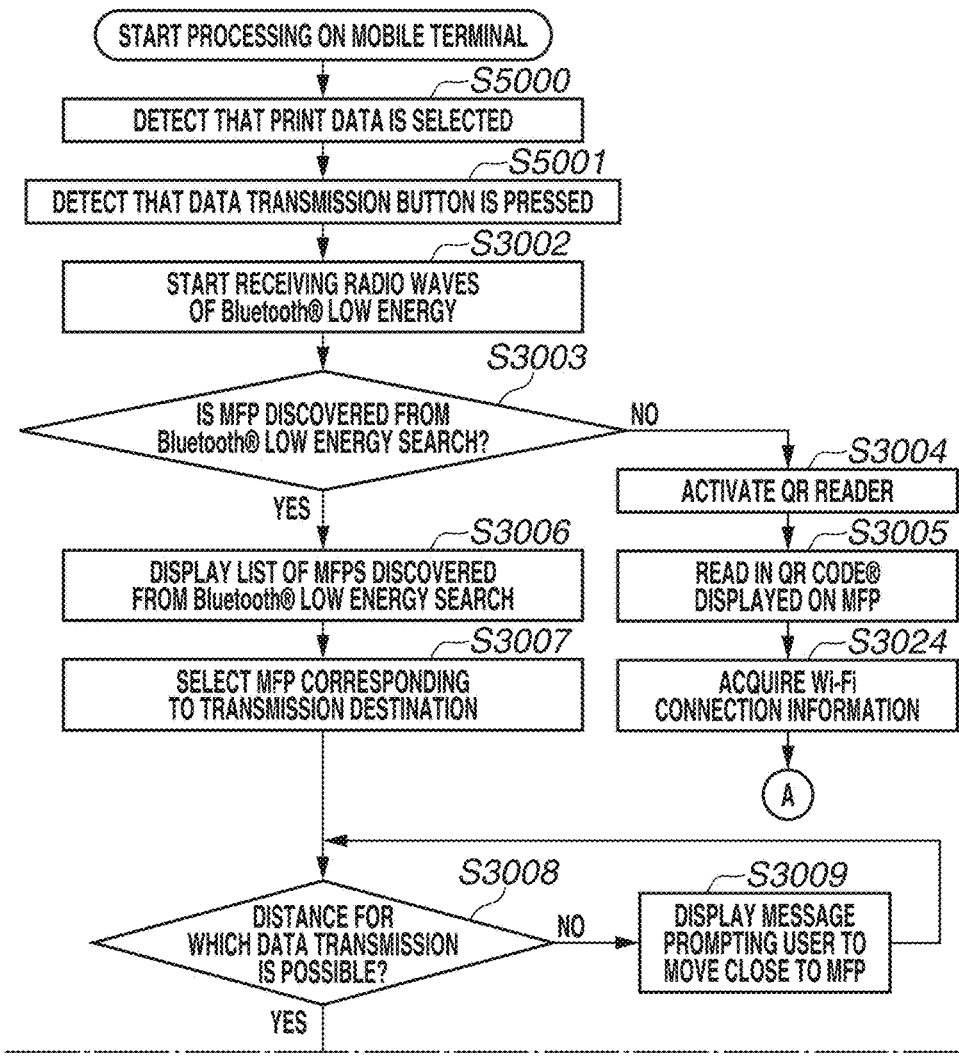

INFORMATION TERMINAL CONFIGURED TO TRANSMIT DATA WITH USE OF WIRELESS COMMUNICATION, IMAGE PROCESSING APPARATUS, IMAGE PROCESSING SYSTEM, AND STORAGE MEDIUM

CROSS-REFERENCE TO RELATED APPLICATIONS

This application is a continuation of U.S. patent application Ser. No. 15/451,213, which was filed on Mar. 6, 2017 and which claims priority to Japanese Patent Application No. 2016-048340, which was filed on Mar. 11, 2016. These applications are hereby incorporated by reference herein.

BACKGROUND

Field

The present disclosure relates to an information processing technique using wireless communication.

Description of the Related Art

It is becoming common that multifunctional peripheral apparatuses (hereinafter referred to as "MFP") are provided with a function of transmitting data of an image of an original document read in by a scanner to a set transmission destination (hereinafter referred to as a transmission function).

In recent years, there have been increasing needs for utilizing data in a mobile terminal for use on the MFP, which has led to emergence of a function of enabling the MFP and the mobile terminal to cooperate with each other, e.g., a function discussed in Japanese Patent Application Laid-Open No. 2015-207875.

The MFP discussed in Japanese Patent Application Laid-Open No. 2015-207875 receives data containing a transmission destination of an electronic mail (E-mail) or the like from the mobile terminal via wireless communication. The MFP sets the transmission destination to which the MFP transmits original document image data based on the received data.

In some instances, MFPs will, in view of security issues, conduct authentication management requiring a user's login as a prerequisite. Such MFPs determine whether to permit the user's login based on user credential information received from the user. Once the user's login is permitted, the MFP is brought into a state where each function included in the MFP, such as a copy function and/or the transmission function, can be used via an operation panel of the MFP.

SUMMARY

According to an aspect of the present invention, a control method for controlling an information terminal includes transmitting information relating to user authentication to an image processing apparatus by a first communication method for short-range wireless communication, wherein the image processing apparatus performs processing for the user authentication with use of the transmitted information relating to the user authentication, and, upon condition that the user authentication has succeeded, the image processing apparatus transitions to a status in which at least one function included in the image processing apparatus can be used via an operation unit of the image processing apparatus, and transmitting data to be used in any one of individual functions included in the image processing apparatus to the image processing apparatus based on receipt of information indicating the successful user authentication from the image processing apparatus, wherein the image processing apparatus uses the transmitted data as a setting of the at least one function of the image processing apparatus that corresponds to the data.

Further features will become apparent from the following description of exemplary embodiments with reference to the attached drawings.

BRIEF DESCRIPTION OF THE DRAWINGS

FIGS. 4A and 4B are block diagrams illustrating software configurations of the MFP and the mobile terminal, respectively.

FIG. 15 is a flowchart exemplarily illustrating details of a process performed in step S3022 illustrated in FIG. 14 (14A and 14B).

DESCRIPTION OF THE EMBODIMENTS

Figure 1:
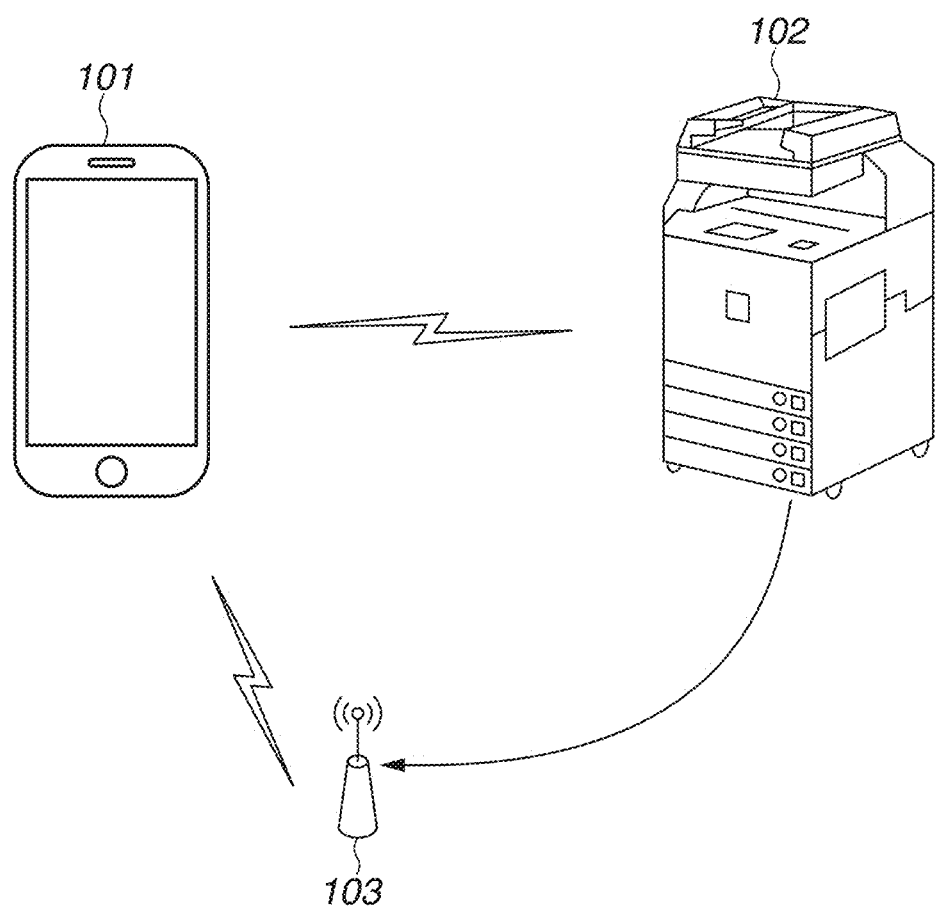
FIG. 1 illustrates an example of a configuration of a system to which an exemplary embodiment is applicable.

Exemplary embodiments will be described below with reference to the drawings.

For an MFP configured to conduct authentication management that requires a user's login as a prerequisite, the user's login to the MFP becomes necessary even when a mobile terminal transmits data, e.g., a destination of an electronic mail (E-mail), to the MFP.

When performing processing in cooperation with the mobile terminal on the MFP configured to conduct the authentication management that requires the user's login as the prerequisite, a user typically transmits the data to the MFP by logging into the MFP and then operating the mobile terminal. The user typically performs the operation directed to the MFP and the operation directed to the mobile terminal, which makes the procedure cumbersome.

Under these circumstances, the present inventor(s) have considered, in view of the recent widespread use of mobile terminals equipped with a wireless communication function, enabling the user to log into the MFP from the mobile terminal and transmit data from the mobile terminal to the MFP would improve convenience and would address the above-described conventional operability. In other words, the present inventor(s) have considered that enabling the user to log into the MFP and transmit the data to the MFP by simply performing the user operation from the mobile terminal would simplify the conventional cumbersome user operation necessitating the user operations directed to the two devices, making this technique more user-friendly.

In light of the above, exemplary embodiments described below are constructed to, in a cooperation between an information processing apparatus and an external apparatus, enable the user to easily achieve the cooperation with the mobile terminal via wireless communication suitable for a situation without being forced to engage in a cumbersome operation.

After logging into the MFP, the user can perform processing by selecting any of individual functions included in the MFP from an operation panel of the MFP. Therefore, the user will typically log in while staying close to the MFP.

Therefore, login from a user located at a position away from the MFP is typically not permitted, even when the MFP is configured to enable the user to log into the MFP via wireless communication. In other words, wireless communication covering a relatively narrow communication range is more suitable for the login using the wireless communication than wireless communication covering a relatively wide communication range.

When the user transmits data from the mobile terminal to the MFP via wireless communication, the amount of data being transmitted can be large. In other words, high-speed wireless communication, which can transmit a large amount of data in a short time period, is suitable for the wireless communication to be used to transmit the data. In this manner, a characteristic of the wireless communication is different between when the login is attempted from the mobile terminal to the MFP and when the data is transmitted from the mobile terminal to the MFP.

The exemplary embodiments described below are constructed to, in the cooperation between an information processing apparatus and an external apparatus, enable a user to easily achieve the cooperation with the mobile terminal via wireless communication suitable for the situation without being forced to engage in cumbersome operation(s).

<System Configuration According to First Exemplary Embodiment>

FIG. 1 illustrates one example of a configuration of a system to which a first exemplary embodiment is applicable.

As exemplified in FIG. 1, in the system according to the present exemplary embodiment, a mobile terminal 101, an MFP 102, and an access point 103 are communicable via respectively corresponding Wi-Fi® communication (communication in conformity to the communication standards defined as the Institute of Electrical and Electronics Engineers (IEEE) 802.11 series). The configuration illustrated in FIG. 1 is merely an example of a common configuration. Therefore, for example, the mobile terminal (a portable terminal) 101 can be any other type of information apparatus.

The mobile terminal 101 and the MFP 102 can connect to and communicate with each other in the Wi-Fi® infrastructure mode via the access point 103. The MFP 102 can itself operate in the access point mode of Wi-Fi®, i.e., the Wi-Fi® AP mode. In this case, the mobile terminal 101 and the MFP 102 can also directly connect to and communicate with each other via the direct Wi-Fi® connection without using the access point 103. The Wi-Fi® AP mode is also called the software access point mode.

Next, hardware configurations of the MFP 102 and the mobile terminal 101 will be described with reference to FIGS. 2 and 3, respectively.

<Hardware Configuration of MFP 102>

Figure 2:
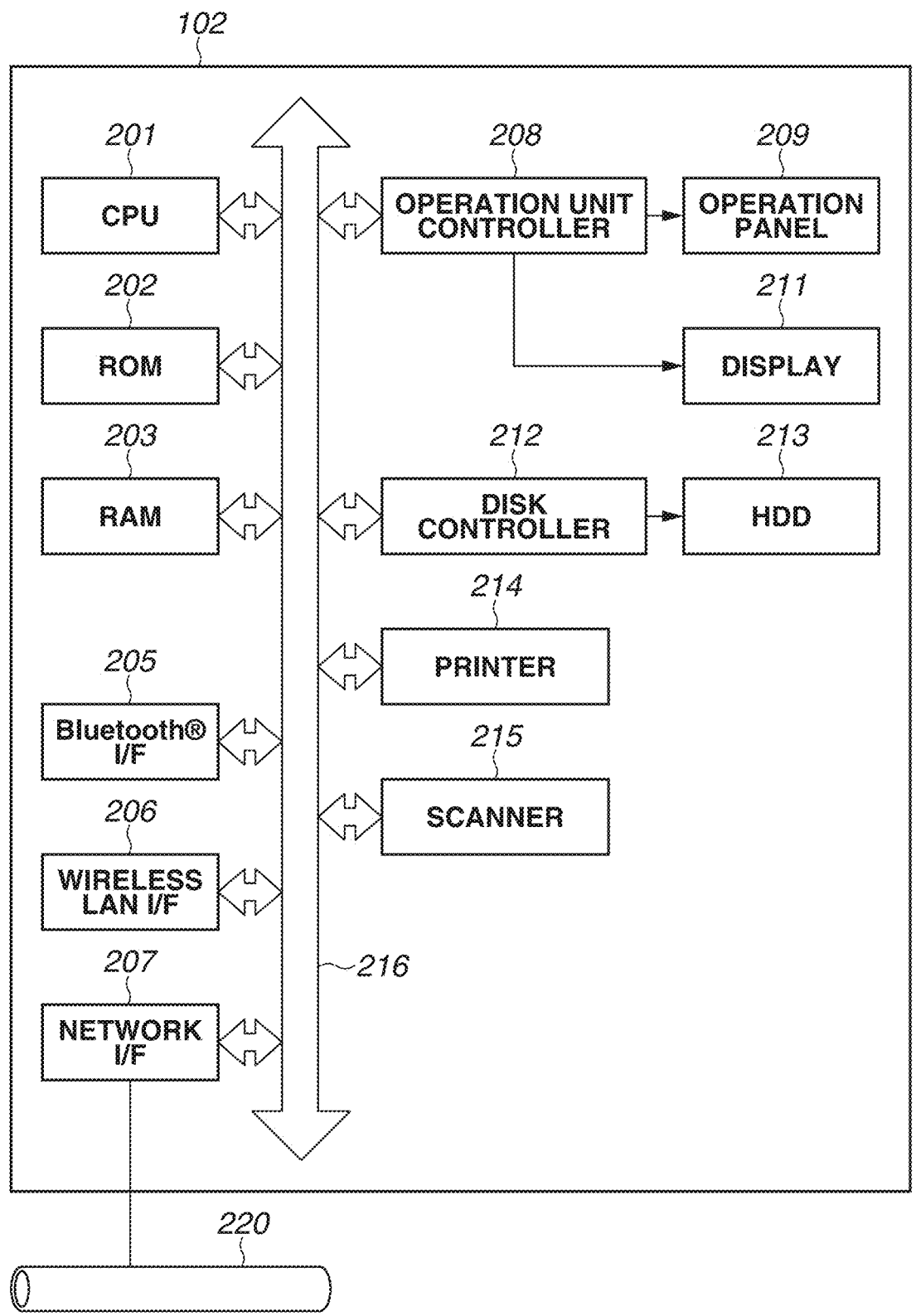
FIG. 2 is a block diagram illustrating a hardware configuration of a multifunction peripheral (MFP).

FIG. 2 illustrates one example of the hardware configuration of the MFP 102.

As illustrated in FIG. 2, the MFP 102 includes a central processing unit (CPU) 201, which executes software stored in a read only memory (ROM) 202 or, for example, a hard disk (a hard disk drive (HDD)) 213. The CPU 201 comprehensively controls each device connected to a system bus 216.

A random access memory (RAM) 203 functions as a main memory, a work area, and/or the like of the CPU 201. An operation unit controller 208 controls, for example, various kinds of buttons (not illustrated), or an operation panel 209 and a display 211 provided on the MFP 102. A disk controller 212 controls the HDD 213. The HDD 213 can also be used as a location where an image is temporarily stored. The MFP 102 can include another storage device, such as a solid state drive (SSD), instead of or together with the HDD 213.

A network interface (I/F) 207 bi-directionally exchanges data with another network apparatus, a file server, or the like via a network 220.

The MFP 102 also includes a wireless local area network (LAN) I/F 206. When operating in the infrastructure mode, the wireless LAN I/F 206 connects to the network 220 via an access point, and bi-directionally exchanges data with another network apparatus, a file server, or the like via the access point. When the wireless LAN I/F 206 is operating in the Wi-Fi® AP mode, the MFP 102 can operate as the access point, and carry out the wireless communication connection directly with the mobile terminal 101 or the like. In other words, the MFP 102 includes a function of carrying out the communication between the mobile terminal 101 and the MFP 102 without going through an access point outside the mobile terminal 101 and the MFP 102. This communication function is enabled, as described in detail below, when the MFP 102 receives a request to start the Wi-Fi® AP mode from the mobile terminal 101.

A printer 214 is a printing unit for printing data onto paper or the like that is realized by, for example, an electrophotographic method. The printing method however is not limited to the electrophotographic method, and can be any printing method.

A scanner 215 is an image reading unit for reading in an image printed on paper or the like. In many cases, the scanner 215 is equipped with an automatic document feeder (ADF) (not illustrated) as an option, and can automatically read in a plurality of original documents.

The MFP 102 also includes a Bluetooth® I/F 205. The MFP 102 can transmit and receive data to and from various kinds of peripheral devices via the Bluetooth® I/F 205. Regarding Bluetooth®, devices supporting Bluetooth® Low Energy designed for power saving communication have started becoming also common in recent years.

<Hardware Configuration of Mobile Terminal 101>

Figure 3:
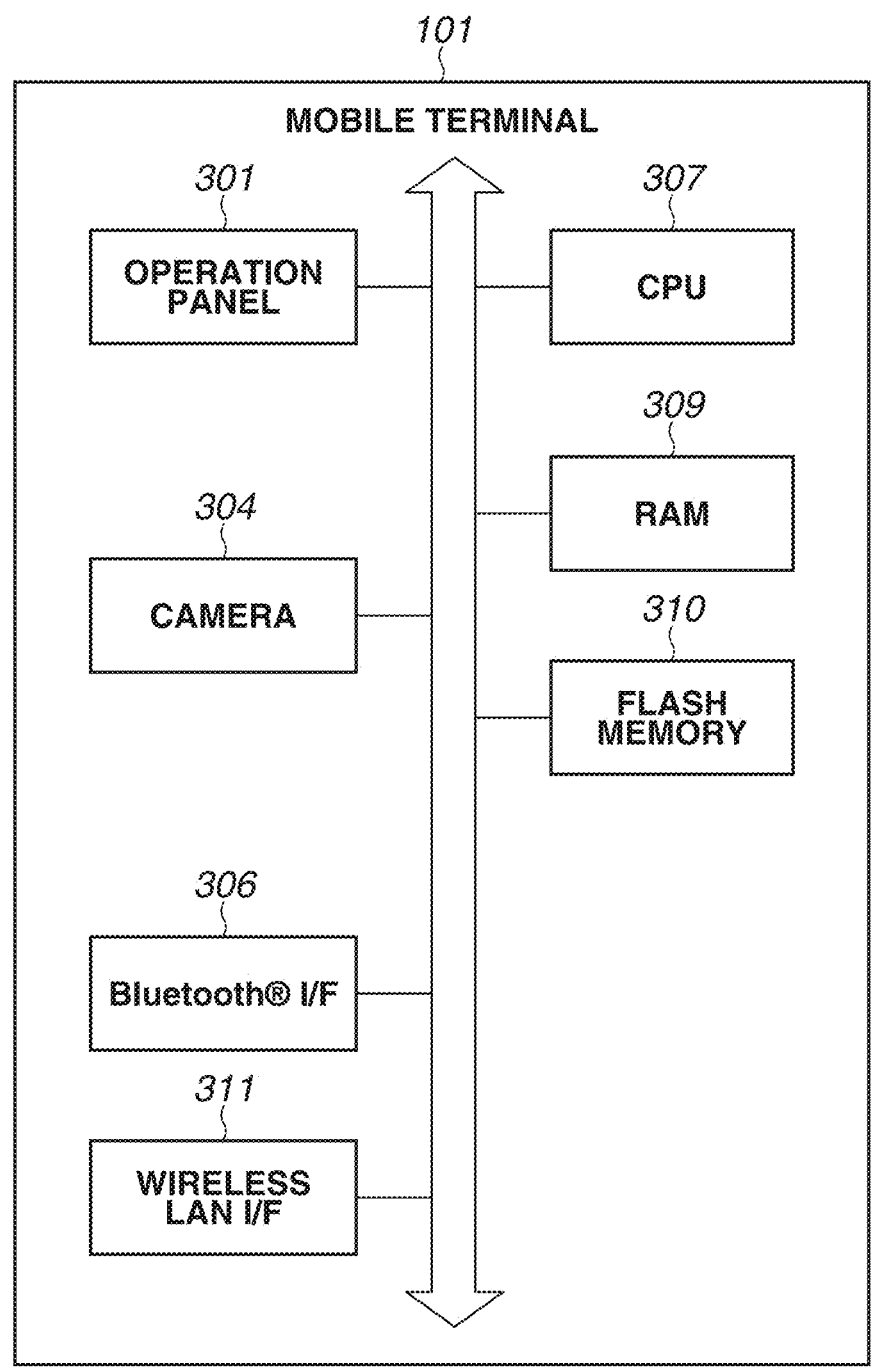
FIG. 3 is a block diagram illustrating a hardware configuration of a mobile terminal.

FIG. 3 illustrates one example of the hardware configuration of the mobile terminal 101. The mobile terminal 101 according to the present exemplary embodiment is assumed to be an apparatus such as a smart-phone and a tablet-type computer, but can be any other apparatus as long as it is an information processing apparatus that carries out Wi-Fi® communication and Bluetooth® Low Energy communication.

Referring to FIG. 3, the mobile terminal 101 includes a CPU 307. The CPU 307 reads out a control program stored in a flash memory 310, and performs various kinds of processing for controlling an operation of the mobile terminal 101. The flash memory 310 stores the control program. A RAM 309 is used as a temporary storage area, such as a main memory and a work area of the CPU 307. The flash memory 310 is also used to store various kinds of data, such as digital images and electronic documents.

An operation panel 301 includes a touch panel function that detects, for example, a user touch operation, and displays various kinds of screens provided by an operating system (OS) and various kinds of applications, e.g., an E-mail transmission application. The user can input a desired operation instruction to the mobile terminal 101 by inputting the touch operation onto the operation panel 301. The mobile terminal 101 includes a not-illustrated hardware key, and the user can also input the operation instruction to the mobile terminal 101 using this hardware key. The user can also input the instruction with a voice from a not-illustrated microphone.

A camera 304 captures an image according to an imaging instruction from the user. The image captured by the camera 304 is stored in a predetermined area in the flash memory 310. The CPU 307 can also acquire information from a Quick Response (QR) Code® read out by the camera 304 with use of a program capable of analyzing the QR Code®.

The mobile terminal 101 also includes a Bluetooth® I/F 306. The mobile terminal 101 can transmit and receive data to and from various kinds of peripheral devices via the Bluetooth® I/F 306. The Bluetooth® I/F 306 can support Bluetooth® Low Energy communication. The mobile terminal 101 also includes a wireless LAN I/F 311. The mobile terminal 101 can transmit and receive data to and from various kinds of peripheral devices via the wireless LAN I/F 311. The wireless LAN I/F 311 can connect to the MFP 102 via the access point 103 or directly without going through the access point 103.

<Software Configurations according to Present Exemplary Embodiment>

Next, software configurations of the MFP 102 and the mobile terminal 101 will be described with reference to FIGS. 4A and 4B, respectively.

FIG. 4A is a block diagram illustrating one example of the software configuration of the MFP 102 and a data area managed by the software. The CPU 201 executes the program stored in the ROM 202 or the like, by which the software illustrated in FIG. 4A functions.

In FIG. 4A, a platform 806 can be constructed in the form of including an operating system, such as Linux®, a JAVA® virtual machine, an Open Services Gateway initiative (OSGi) framework, and/or a group of device drivers. The platform 806 includes device drivers for controlling various kinds of hardware, and provides an application programming interface (API) for using the hardware to an application running on the platform 806.

For example, the Bluetooth® control unit 807 is a device driver for controlling the Bluetooth® I/F 205. A network control unit 808 is a device driver for controlling the wireless LAN I/F 206 and the network I/F 207. In addition, while not illustrated, a printer module for controlling the printer 214, a scanner module for controlling the scanner 215, and the like are also prepared in the platform 806. The platform 806 also provides an API for reading and writing data from and into a document 809 and a print job 810 to the application. The document 809 and the print job 810 indicate data areas of data managed while being recorded in the RAM 203 or the HDD 213 by the platform 806.

Copy 801, transmission 802, and print 803 are applications that run on the platform 806, and display user interfaces for presenting various kinds of functions on the display 211. For example, the copy 801 carries out copying by controlling the scanner 215 and the printer 214 via the platform 806. The transmission 802 provides a function of transmitting the read document data to the network 220 by controlling the scanner 215 and the network I/F 207. The print 803 provides a function for printing the document data stored in the document 809 and a print job held in the print job 810.

A menu 800 is a module that displays a menu for selecting an application, e.g., the copy 801, the transmission 802, and the print 803, from the display 211. A remote user interface (UI) 811 provides a user interface for managing settings of the MFP 102 and a user interface for printing the document data stored in the document 809 to, for example, the mobile terminal 101. A login service 804 is a module that provides a login function for using the MFP 102. A user account 805 indicates a data area of data managed while being recorded in the RAM 203 or the HDD 213 by the login service 804.

<Description of Overview of Login Service 804>

The login service 804 includes (1) a function of managing a user account, (2) a local login function, (3) a login function for accessing a service of the Bluetooth® Low Energy communication, and (4) a remote login function.

(1) Function of Managing User Account

The login service 804 provides a user interface to the user for registering and managing the user's account. The login service 804 records information registered via the user interface in the user account 805 and manages it. Examples of the managed information include a username, a password, and a role, like examples indicated in the following table 1 (a user information list).

TABLE 1

| User Information List | | |
|---|---|---|
| Username | Password | Role |
| Alice | Password1 | Administrator |
| Bob | Password2 | General User |
| Carol | Password3 | General User |
| Dave | Password4 | Guest User |

(2) Local Login Function

The login service 804 provides a login/logout function to the user using the operation unit. The login service 804 displays a login screen 701 (FIG. 9) on the display 211, and blocks a user not logged in from using the function. The number of users permitted to locally log in at the same time is one, and a plurality of users cannot locally log in at the same time. If the user's login succeeds, the login service 804 causes the display 211 to transition from the login screen 701 to a menu screen 705 (FIG. 9), thereby bring the MFP 102 into a status where the user can use the MFP 102. The login service 804 provides a plurality of login methods as methods for locally logging in. For example, the login service 804 provides the login methods like the following examples:

a. Keyboard Login Method ii) The login service 804 performs login processing by displaying a software keyboard on the login screen 701 on the display 211, acquiring the username and the password input thereon, and authenticating the user.

b. Mobile Login Method iii) The login service 804 performs login processing by receiving a login request together with user authentication information from the mobile terminal 101 via the Bluetooth® Low Energy communication, and authenticating the user.

iv) The login service 804 is a mechanism that permits or rejects the login depending on a status of the MFP 102 when the above-described login is attempted. The MFP 102 records StatusID indicated in the following table 2 (a list of statuses in which the login is possible or impossible) into the RAM 203, and manages it. The mobile login is realized with use of a user authentication service 1000 illustrated in FIG. 5, which will be described below.

TABLE 2

List of Statuses in which Login is Possible or Impossible

| StatusID | Meaning |
|---|---|
| 1 | Login is possible |
| 2 | Login is impossible because another user is logged in |
| 3 | Login is impossible because the login screen is not displayed now |
| 4 | Login is impossible because the mobile login is prohibited |

The MFP 102 conducts status management that controls the status of the MFP 102 in such a manner that the status transitions to a status capable of receiving the transmission of the data from the mobile terminal 101 based on whether the local login processing has succeeded. More specifically, the MFP 102 controls the status of the MFP 102 in such a manner that the status remains a status incapable of receiving the transmission of the data from the mobile terminal 101 if no user is locally logged in, and transitions to the status capable of receiving the transmission of the data from the mobile terminal 101 if the local login succeeds.

The login service 804 includes the following plurality of methods as logout methods after the local login:

A method that displays a logout button on the operation panel 209 and performs logout processing upon detecting that the button is pressed.

A method that performs the logout processing if no operation is input on the operation panel 209 and the display 211 for a predetermined time period.

A method that performs the logout processing in response to a logout request from the mobile terminal 101.

After the logout processing, the login service 804 displays the login screen 701.

(3) Remote Login Function

The login service 804 provides a login/logout function when the remote UI 811 is used with regard to the remote login function. For example, when detecting access from the mobile terminal 101 to the remote UI 811, the login service 804 transmits a login screen written in Hypertext Markup Language (HTML) to the mobile terminal 101. The login service 804 acquires a username and a password input on the above-described login screen and authenticates the user, thereby permitting the login to the remote UI 811. The login service 804 is configured to allow a plurality of users to remotely log in at the same time with regard to the remote login function.

(4) Login Function for Accessing Service of Bluetooth® Low Energy Communication

The login service 804 provides a login/logout function for accessing a service published via Bluetooth® Low Energy (FIG. 5) with regard to the login function for accessing the service of the Bluetooth® Low Energy communication. The present function also carries out the authentication via the Bluetooth® Low Energy communication, but does not switch the screen displayed on the display 211 after the login, unlike the "mobile login method" in the local login function.

<Software Configuration of Mobile Terminal 101>

FIG. 4B is a block diagram illustrating one example of the software configuration of the mobile terminal 101.

The mobile terminal 101 includes a platform 902 and an MFP cooperation application (hereinafter referred to as an application) 900 as software. The CPU 307 executes the program stored in the flash memory 310, by which the platform 902 functions. The application 900 is also a program stored in the flash memory 310, and functions by being executed by the CPU 307 under control by the platform 902.

The platform 902 can be embodied by a platform (an OS and the like) such as Android® and iOS®. The platform 902 includes a group of device drivers for controlling various kinds of hardware of the mobile terminal 101, and provides APIs for using the various kinds of hardware to the application 900 running on the platform 902.

The application 900 is software that performs each processing by controlling the hardware of the mobile terminal 101 via the API provided by the platform 902. More specifically, the application 900 requests the platform 902 to perform processing via the API, and the platform 902 performs the desired processing by the hardware using a device driver according to a content of the requested processing. Then, the platform 902 returns a result of this processing to the application 900 via the API.

In the present exemplary embodiment, the group of device drivers includes a Bluetooth® control unit 903 and a wireless network control unit 904. The Bluetooth® control unit 903 is a device driver for controlling the Bluetooth® I/F 306. The wireless network control unit 904 is a device driver for controlling the wireless LAN I/F 311.

To carry out the data transmission and reception with an apparatus external to the mobile terminal 101, e.g., the MFP 102, via the Bluetooth® Lowe Energy communication, the application 900 first requests the platform 902 to carry out the data transmission and reception with the external apparatus via the Bluetooth® Low Energy communication. Then, the platform 902 controls the Bluetooth® I/F 306 with the Bluetooth® control unit 903 to carry out the data transmission and reception with the external apparatus via the Bluetooth® Low Energy communication. In the following description, unless otherwise indicated, the data transmission and reception between the application 900 and the external apparatus are assumed to be carried out via the Bluetooth® Low Energy communication according to such a processing procedure when the application 900 carries out the data transmission and reception with the external apparatus via the Bluetooth® Low Energy communication.

To carry out the data transmission and reception with an apparatus external to the mobile terminal 101, e.g., the MFP 102, via the Wi-Fi® communication, the application 900 first requests the platform 902 to carry out the data transmission and reception with this external apparatus via the Wi-Fi® communication. Then, the platform 902 controls the wireless LAN I/F 311 using the wireless network control unit 904 to carry out the data transmission and reception with the external apparatus via the Wi-Fi® communication. In the following description, unless otherwise indicated, the data transmission and reception between the application 900 and the external apparatus are assumed to be carried out via the Wi-Fi® communication according to such a processing procedure when the application 900 carries out the data transmission and reception with the external apparatus via the Wi-Fi® communication.

The application 900 includes, for example, the following functions:
(1) A function of connecting to the MFP 102 via the Bluetooth® Low Energy communication and issuing the login request and the logout request. The user can prerecord the user authentication information (the username and the password) to be used at the time of the login request into the flash memory 310 as authentication information 901 with use of the application 900. For example, the user prerecords information like examples indicated in the following table 3 (authentication information):

TABLE 3

Figure 5:
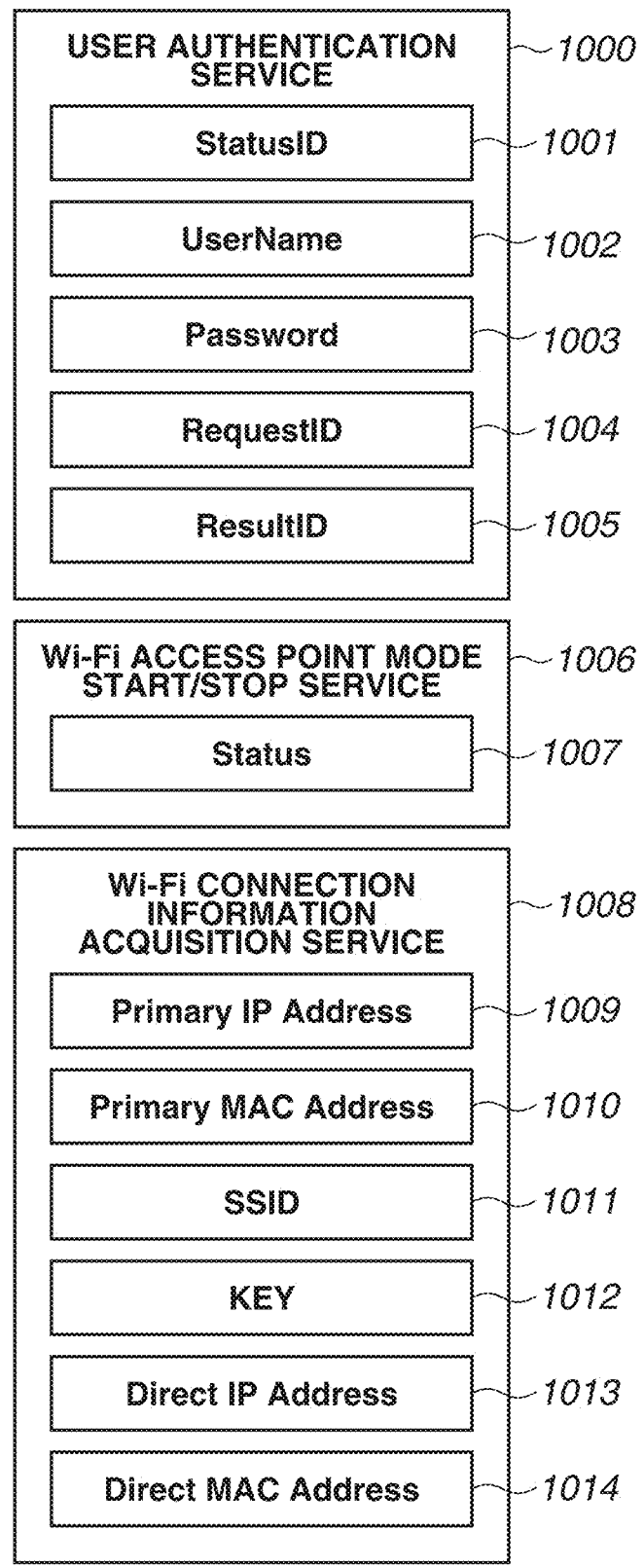
FIG. 5 illustrates examples of services of Bluetooth that the MFP includes.

| Authentication Information | |
|---|---|
| Item | Value |
| Username | Alice |
| Password | Password1 | ii) (2) A function of connecting to the MFP 102 via the Bluetooth® Low Energy communication and performing processing for starting/stopping the Wi-Fi® AP mode. A Wi-Fi® AP mode start/stop service 1006 illustrated in FIG. 5 is used in this processing. Details thereof will be described below.
iii) (3) A function of launching a web browser 905 and connecting to the remote UI 811.
iv) (4) A function of transmitting information such as destination data registered with an address book 906 of the mobile terminal 101, a subject, a message body, and a name of an attached file when an E-mail is transmitted, to the MFP 102 using the Wi-Fi® communication. In the present exemplary embodiment, the address book 906 is managed by the application 900, but can be managed by the platform 902. In this case, the application 900 is configured to request the destination data in the address book 906 to the platform 902 to acquire the destination data registered with the address book 906. Assume that the application 900 holds, for example, a setting value like examples indicated in the following table 4 (a list of Bluetooth® connection settings for the destination transmission). The following table 4 means that, when the data, e.g., the destination, is transmitted using the Bluetooth® Low Energy communication, this transmission is possible only when a distance between the mobile terminal 101 and the MFP 102 is less than 50 cm. The mobile terminal 101 is configured in such a manner that the data transmission can be used only when the distance is less than 50 cm for the purpose of guaranteeing that the user using the data transmission stays by the MFP 102. This is because, if the destination transmission can be used from a distant location contrary thereto, the destination can be unknowingly set to the MFP 102 while another user is using the MFP 102, and the E-mail can be accidentally transmitted. In the present exemplary embodiment, the mobile terminal 101 estimates the distance between the mobile terminal 101 and the MFP 102 using the Bluetooth® Low Energy communication before attempting the login of the above-described function (1). Then, the distance is estimated to be less than a predetermined distance (less than 50 cm in the example indicated in the table 4), the mobile terminal 101 attempts the login of the above-described function (1). If this distance is estimated to be the predetermined distance or longer, the mobile terminal 101 does not attempt the login of the above-described function (1).

TABLE 4

| List of Bluetooth ® Connection Settings for Destination Transmission | |
|---|---|
| Distance | Status |
| Less than 50 cm | Data transmission is possible |
| Greater than or equal to 50 cm | Data transmission is impossible |

The mobile terminal 101 can be configured in such a manner that the user of the mobile terminal 101 can change the distance in the above-described list of Bluetooth® connection settings for the destination transmission, or can be configured to acquire the setting from the MFP 102. The mobile terminal 101 uses a received signal strength indicator (RSSI) (a strength of a received signal) of Bluetooth® issued from the MFP 102 for the measurement of the distance from the MFP 102. For example, data indicating a relationship between the RSSI and the distance from the MFP 102 can be created like data indicated in the following table 5 (a list of RSSIs and estimated distances), with use of such a property that, as the distance between the MFP 102 and the mobile terminal 101 increases, the RSSI attenuates. Then, the mobile terminal 101 measures the distance from the MFP 102 by using this data.

TABLE 5

| List of RSSIs and Estimated Distances | |
|---|---|
| RSSI (dBm) | Estimated Distance |
| −40 | 10 cm |
| −50 | 50 cm |
| −59 | 1 m |
| −62 | 2 m |

<Functions and Services of Bluetooth® that MFP 102 Includes>

When the MFP 102 according to the present exemplary embodiment is powered on, the platform 806 activates Bluetooth® and transmits an advertising packet of Bluetooth® at predetermined time intervals via the Bluetooth® control unit 807. The advertising packet contains data like the following examples: Local Name: indicates a device name or the like, such as "Canxn MFP CXXX".
Manufacturer Specific Data: an identifier of a company and arbitrary data are stored therein.
TX Power Level: indicates a strength of transmitted radio waves, such as −38 dBm.
Service Universally Unique Identifiers (UUIDs): indicate UUIDs identifying functions of the device.

FIG. 5 illustrates one example of services of the Bluetooth® Low Energy communication that the MFP 102 includes.

The MFP 102 according to the present exemplary embodiment publishes various kinds of services defined in Generic Attribute Profile (GATT) to the mobile terminal 101 connected via the Bluetooth® Low Energy communication. These services are the user authentication service 1000, the Wi-Fi® AP mode start/stop service 1006, and a Wi-Fi® connection information acquisition service 1008. Next, details thereof will be described.

First, the user authentication service 1000 will be described.

The user authentication service 1000 includes the following characteristics defined in the GATT profile. A profile and a characteristic in GATT are in a relationship to each other like a relationship between a class and a member variable in an object-oriented concept. The login service 804 reads and writes a value of each of the characteristics via the API provided by the platform 806 and the Bluetooth® control unit 807.

StatusID 1001 is a characteristic indicating a status regarding whether the login to the MFP 102 is possible. The mobile terminal 101 acquires StatusID 1001 by a read operation, thereby acquiring the status regarding whether the login to the MFP 102 is possible. The MFP 102 stores the value indicated in the table 2 (the list of statuses in which the login is possible or impossible) as the value of StatusID 1001. The login service 804 changes this value according to a change in the status. When the value is changed, the Bluetooth® control unit 807 notifies the currently connected mobile terminal 101 of the change in the value by Notification in Attribute Protocol (ATT).

UserName 1002 and Password 1003 are characteristics used for the mobile terminal 101 to input the username and the password by a write operation when issuing the login request, respectively. UserName 1002 and Password 1003 can be configured as characteristics requiring encryption for a write operation.

RequestID 1004 is a characteristic used for the mobile terminal 101 to input a request to the user authentication service 1000 by a write operation. For example, the mobile terminal 101 inputs a value of RequestID, like examples indicated in the following table 6 (a list of RequestIDs) into RequestID 1004 by a write operation as the request to the user authentication service 1000.

TABLE 6

List of RequestIDs

| RequestID | Meaning |
|---|---|
| 1 | Login Request |
| 2 | Logout Request |
| 3 | Login Request for Accessing Bluetooth Service |

ResultID 1005 is a characteristic used for the MFP 102 to store an authentication result when carrying out the user authentication (whether the user authentication succeeds) in response to the login request from the mobile terminal 101. For example, the MFP 102 stores a value of ResultID like examples indicated in the following table 7 (a list of ResultIDs) into ResultID 1005 as the authentication result.

TABLE 7

List of ResultIDs

| ResultID | Meaning |
|---|---|
| 1 | Success in Login |
| 2 | Failure in Login |
| 3 | Cancel |
| 4 | Another Error |

When the MFP 102 stores the authentication result into ResultID 1005, the Bluetooth® control unit 807 notifies the currently connected mobile terminal 101 of the change in the value of the authentication result by Notification in ATT.

Next, the Wi-Fi® AP mode start/stop service 1006 will be described.

The Wi-Fi® AP mode start/stop service 1006 includes the following characteristic defined in the GATT profile.

Status 1007 stores therein a value like examples indicated in the following table 8 (a list of Statuses of the Wi-Fi® AP mode).

TABLE 8

List of Statuses of the Wi-Fi ® AP mode

| Status | Meaning |
|---|---|
| 1 | Started Status |
| 2 | Stopped Status |

The MFP 102 provides a function of enabling the direct Wi-Fi® connection between the MFP 102 and the mobile terminal 101 according to a request from the mobile terminal 101 using the Bluetooth® Low Energy communication by the Wi-Fi® AP mode start/stop service 1006.

Next, the Wi-Fi® connection information acquisition service 1008 will be described.

The Wi-Fi® connection information acquisition service 1008 includes the following characteristics defined in the GATT profile.

Primary IP Address 1009 and Primary MAC address 1010 are characteristics indicating an Internet Protocol (IP) address and a media access control (MAC) address when the MFP 102 is connected to the access point 103 in the infrastructure mode, respectively.

SSID 1011 and KEY 1012 are characteristics indicating an identifier (a service set identifier (SSID)) identifying a direct network and a key for connecting to the direct network when the MFP 102 is in operation in the Wi-Fi® AP mode, respectively.

Direct IP Address 1013 and Direct MAC Address 1014 are characteristics indicating an IP address and a MAC address when the MFP 102 is in operation in the Wi-Fi® AP mode, respectively.

<Screens of Mobile Terminal 101>

Screens of the mobile terminal 101 will be described with reference to FIGS. 6, 7, and 8.

<Application Menu Screen of Mobile Terminal 101>

Figure 6:
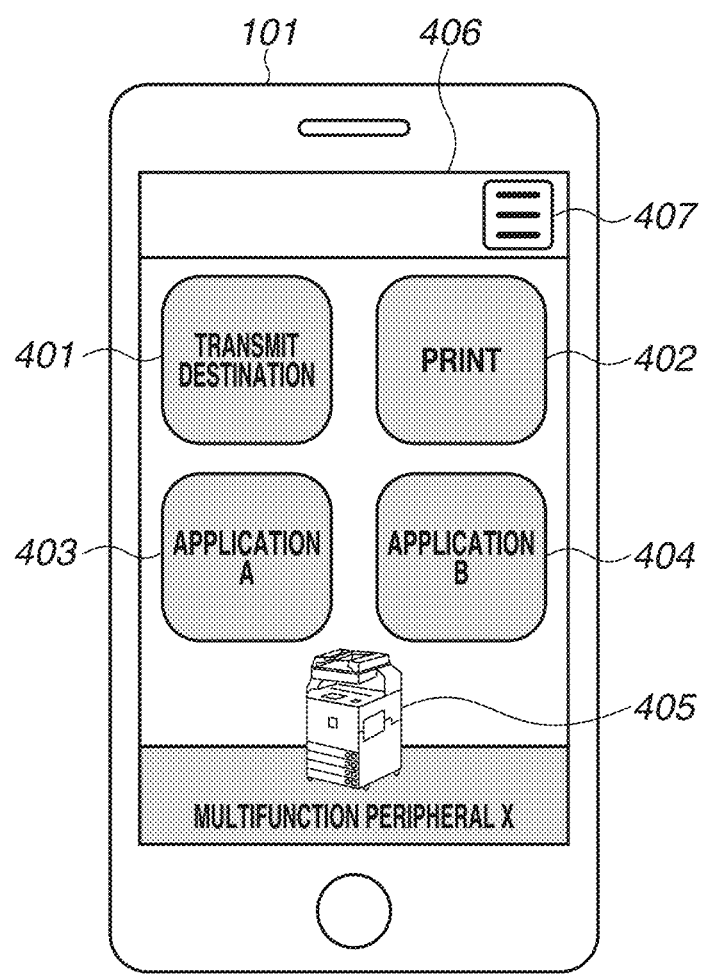
FIG. 6 illustrates an example of an application menu screen of the mobile terminal.

FIG. 6 illustrates one example of a mobile application menu screen 406 on the mobile terminal 101. The user can select a setting of a mobile application and a function that the user wants to use using the present screen. This screen is displayed, for example, when the mobile application is launched.

Function selection buttons 401, 402, 403, and 404 are each a button with which the user can issue an instruction to start use of a function provided by the mobile application.

For example, the function selection button 401 is a button for selecting a "destination transmission" application for setting the destination and the mail information to be transmitted from the mobile terminal 101 to the MFP 102. When the function selection button 401 is pressed, the mobile terminal 101 causes the screen to transition to a destination transmission screen 480 illustrated in FIG. 8, which will be described below.

The function selection button 402 is a button for selecting a "print" application for transmitting print data from the mobile terminal 101 to the MFP 102. When the function selection button 402 is pressed, the mobile terminal 101 causes the screen to transition to a print screen illustrated in FIG. 18, which will be described below. The function corresponding to this function selection button 402 will be described in a description of a second exemplary embodiment.

The function selection buttons 403 and 404 are buttons for selecting an application A and an application B, respectively.

The mobile terminal 101 keeps a record of each MFP that the mobile application has ever previously communicated with in the flash memory 310, and an MFP list display section 405 displays a list thereof. The user can specify the MFP 102 that is the communication destination by selecting it from this MFP list display unit 405.

Figure 7:
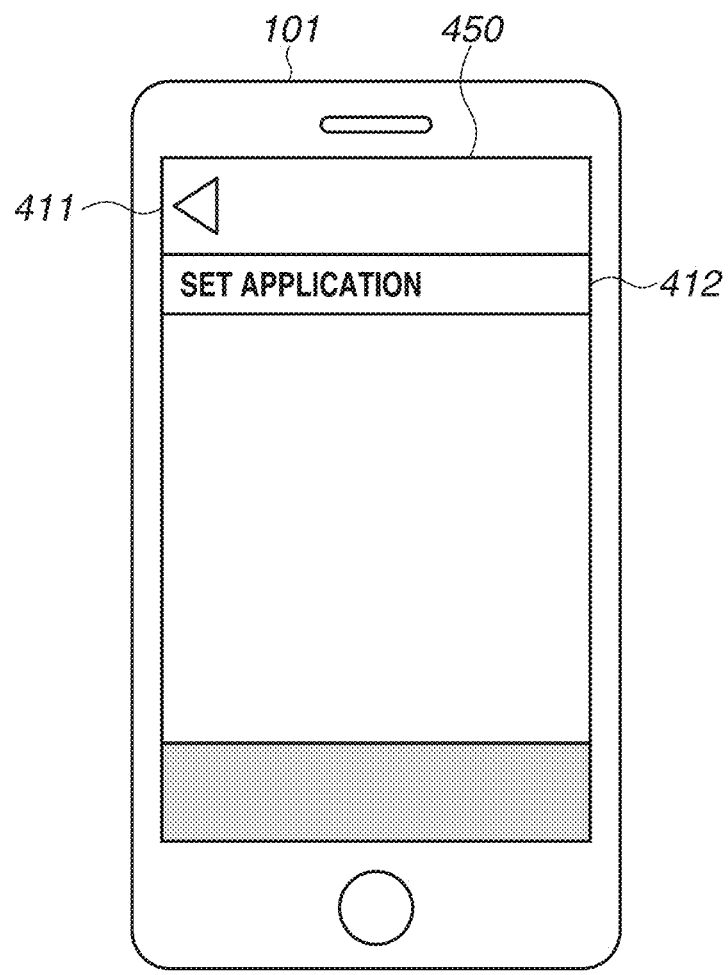
FIG. 7 illustrates an application setting screen of the mobile terminal.

When a mobile application setting button 407 is pressed, the mobile terminal 101 causes the screen to transition to a screen 450 for setting the mobile application, which is illustrated in FIG. 7.

<Application Setting Screen of Mobile Terminal 101>

FIG. 7 illustrates one example of the mobile application setting screen 450 on the mobile terminal 101.

When the user presses an application setting button 412, the mobile terminal 101 displays a list of setting items of the mobile application (not illustrated). The setting items of the mobile application include, for example, registration of a setting of the user authentication information (the authentication information such as the example indicated in the table 3) for the MFP 102.

When the user presses a return button 411, the mobile terminal 101 holds the setting of the mobile application configured via the mobile application setting screen 450, and causes the screen to transition to the mobile application menu screen 406 illustrated in FIG. 6.

<Destination Transmission Screen of Mobile Terminal 101>

Figure 8:
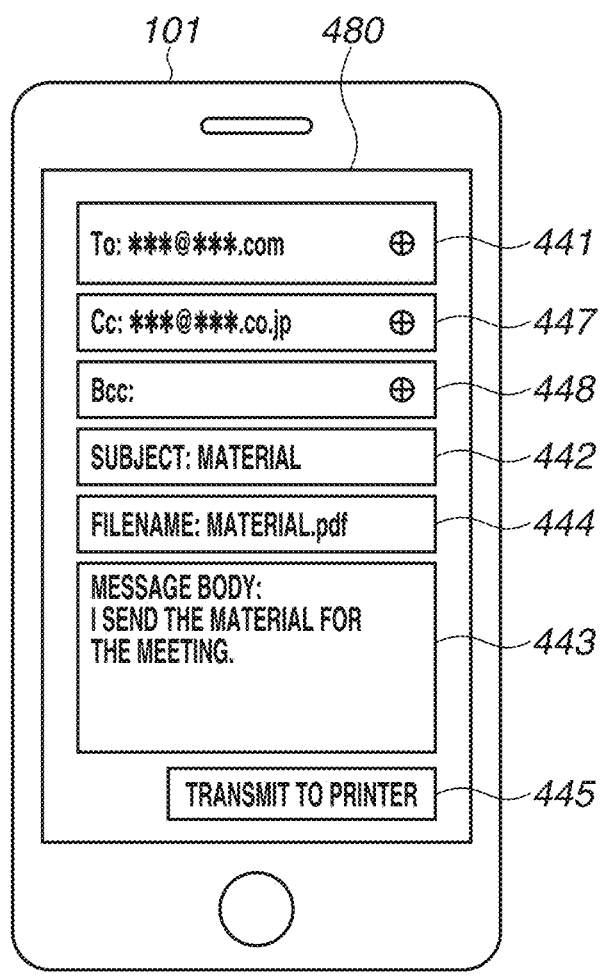
FIG. 8 illustrates an example of a screen of the mobile terminal for transmitting a destination.

FIG. 8 illustrates one example of the destination transmission screen 480 on the mobile terminal 101.

The user can input information required to transmit the E-mail using the destination transmission screen 480.

The destination transmission screen 480 includes an E-mail address field ("To") 441 for selecting a destination in the address book 906 stored in the flash memory 310 of the mobile terminal 101 and inputting the selected destination. A plurality of destinations can be specified at the same time in the E-mail address field ("To") 441.

Similarly, an E-mail address field ("Cc") 447 is a field for selecting a destination in the address book 906 stored in the mobile terminal 101 and inputting the selected destination. A plurality of destinations can be specified at the same time in the E-mail address field ("Cc") 447.

Similarly, an E-mail address field ("Bcc") 448 is a field for selecting a destination in the address book 906 stored in the mobile terminal 101 and inputting the selected destination. A plurality of destinations can be specified at the same time in the E-mail address field ("Bcc") 448.

The E-mail address field ("To") 441, the E-mail address field ("Cc") 447, and the E-mail address field ("Bcc") 448 can also be specified by inputting a new destination from a software keyboard on the mobile terminal 101.

A subject field 442 is a field for inputting a subject of the E-mail.

A message body field 443 is a field for inputting a message body of the E-mail.

A filename field 444 is a field for inputting a name of a file attached to the E-mail.

The user can input a character string into the subject field 442, the message body field 443, and the filename field 444 using the software keyboard on the mobile terminal 101.

The input can be entered into any of the fields using not only the software keyboard but other input methods as well, such as voice recognition.

The system can be configured in such a manner that, besides the information (the destination and the like) required to transmit the E-mail illustrated in FIG. 8, another information, like a scan setting when the MFP 102 scans the original document, such as a resolution and a color mode, can also be set from the mobile terminal 101 to the MFP 102. While details thereof will not be described herein, this information can be set by a similar method to the information required to transmit the E-mail.

When the user presses a button 445 for transmitting the data to the printer, the mobile terminal 101 performs processing for transmitting the data, such as the destination input on the destination transmission screen 480, to the MFP 102, which will be described below with reference to FIG. 14 (14A and 14B). Upon completing the data transmission to the MFP 102, the mobile terminal 101 clears all of the inputs on the destination transmission screen 480, and returns the screen display to the mobile application menu screen 406 illustrated in FIG. 6. If the data transmission fails, the mobile terminal 101 displays an error, and keeps the screen display presenting the destination transmission screen 480 without clearing the inputs on the destination transmission screen 480.

<Screens of MFP 102>

Next, screens displayed on the display 211 of the MFP 102 will be described with reference to FIGS. 9, 10A and 10B, 11A and 11B, and 12.

<Screens of MFP 102 During Login/Logout>

Figure 9:
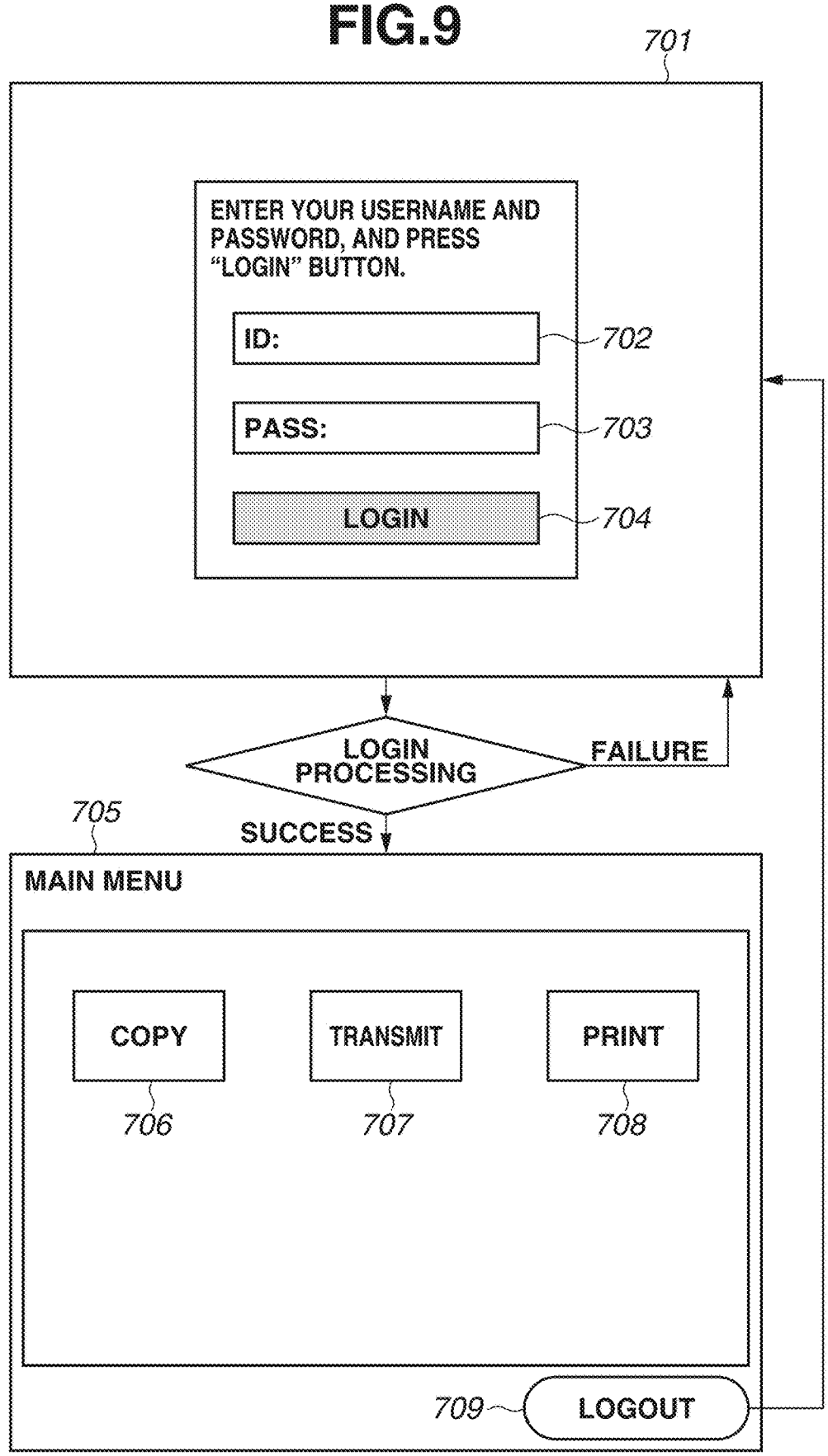
FIG. 9 illustrates an example of a screen transition on the MFP regarding a login and a logout.

FIG. 9 illustrates one example of the screens and a screen transition regarding the login and logout.

For example, in a state before the user logs into the MFP 102, the MFP 102 displays the login screen 701 and waits to receive inputs into a user identification (ID) 702, a password 703, and an event that a login button 704 is pressed, or to receive the login request from the mobile terminal 101 via Bluetooth®.

The MFP 102 performs the login processing upon receipt of the pressing of the login button 704 or the login request via Bluetooth®. Then, the MFP 102 controls the display so as to cause the screen to transition to the menu screen 705 if the login succeeds, and display the originally displayed login screen 701 if the login fails.

The menu screen 705 includes buttons for calling various kinds of applications (a copy button 706, a transmission button 707, and a print button 708 in the case of the example illustrated in FIG. 9), and a logout button 709. When detecting that the logout button 709 is pressed, the MFP 102 performs the logout processing and displays the login screen 701.

<Portal Screen for Mobile Connection on MFP 102>

Figure 10A:
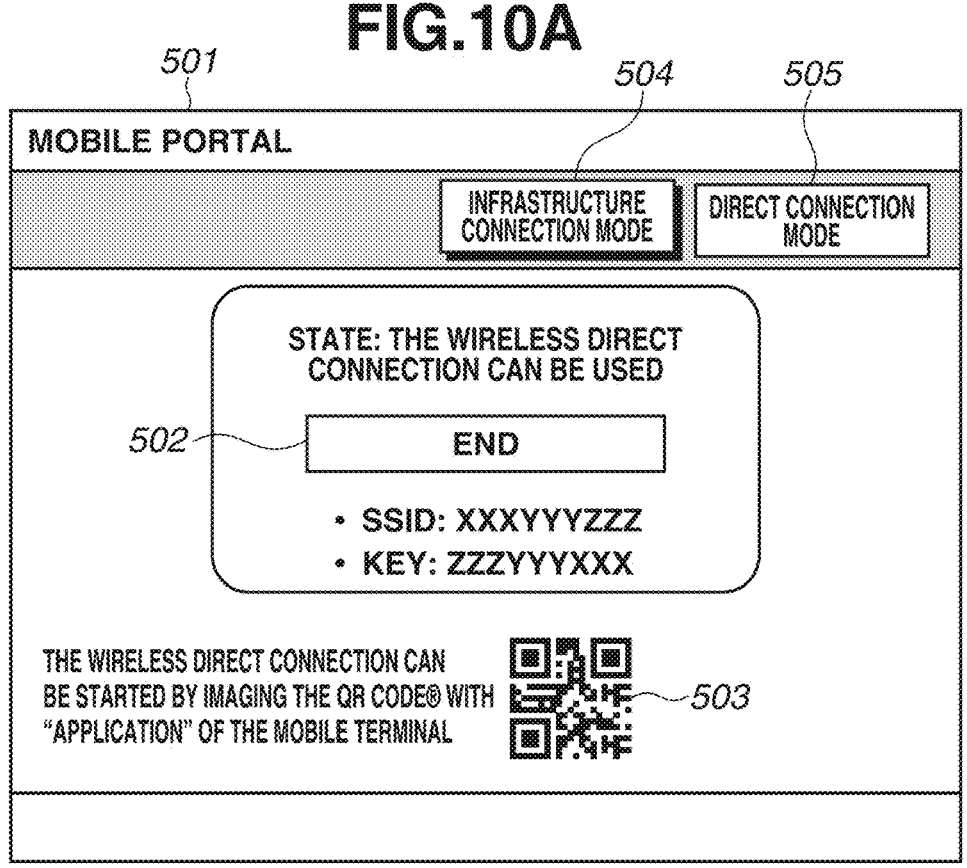
FIGS. 10A and 10B illustrate an example of a screen of the MFP displaying information for a Wireless Fidelity (Wi-Fi®) connection.
Figure 10B:
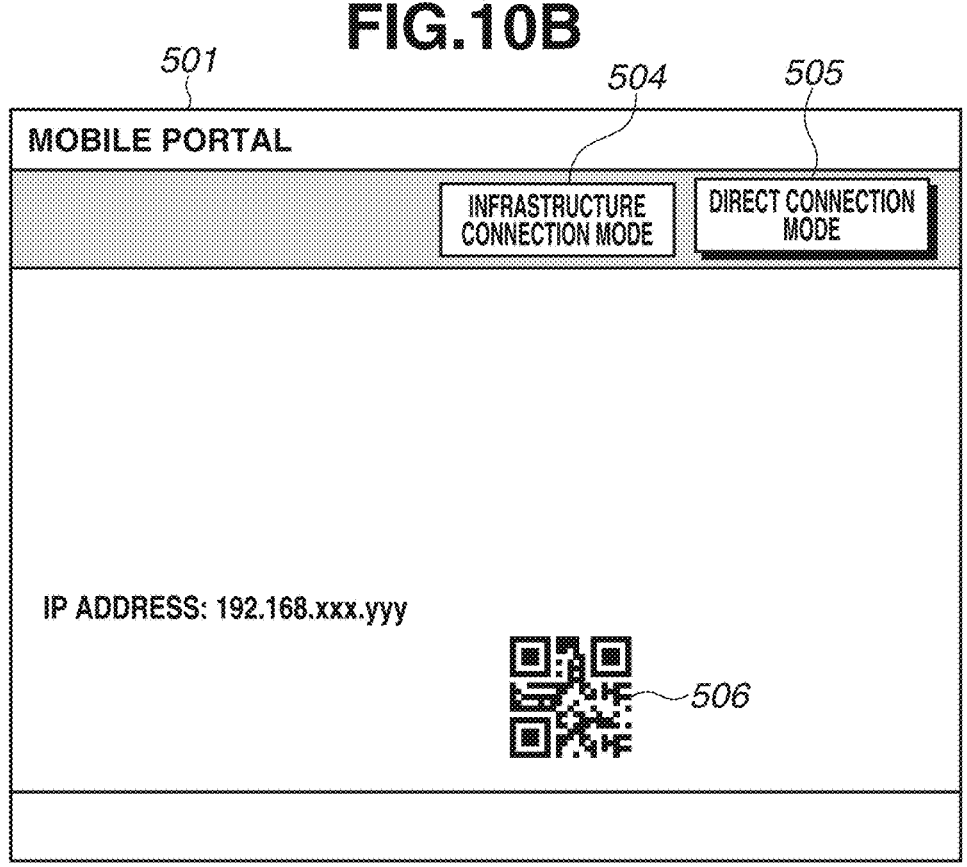

FIGS. 10A and 10B illustrate one example of a portal screen for carrying out the Wi-Fi® connection between the MFP 102 and the mobile terminal 101. This screen is displayed by pressing a button 608 for specifying the destination from the mobile apparatus on a transmission screen 601 illustrated in FIG. 11A, which will be described below.

A mobile portal screen 501 includes an infrastructure connection mode button 504 and a direct connection mode button 505. The infrastructure connection mode button 504 is a button for switching the screen to a display for connecting to the mobile terminal 101 in the Wi-Fi® infrastructure mode (FIG. 10B). The direct connection mode button 505 is a button for switching the screen to a display for connecting to the mobile terminal 101 via the Wi-Fi® direct communication (FIG. 10A).

FIG. 10A illustrates an example of the display when the direct connection mode button 505 is pressed.

When the user presses a Wi-Fi® direct communication operation button 502, the MFP 102 starts or ends the Wi-Fi® direct communication. The example illustrated in FIG. 10A indicates a state in which the Wi-Fi® direct communication is started, whereby pressing the Wi-Fi® direct communication operation button 502 results in the end of the Wi-Fi® direct communication.

When the Wi-Fi® direct communication is started, the MFP 102 displays information required for the Wi-Fi® direct communication on the mobile portal screen 501, and, along therewith, displays a QR Code® 503 in which these pieces of information are embedded. The information required for the Wi-Fi® direct communication is, for example, the SSID and the key, but is not limited thereto. When the Wi-Fi® direct communication ends, the displays of these pieces of information required for the Wi-Fi® direct communication and the QR Code® 503 are removed.

FIG. 10B illustrates the display when the infrastructure connection mode button 504 is pressed. On this screen, the MFP 102 displays information for carrying out the Wi-Fi® infrastructure connection between the mobile terminal 101 and the MFP 102 via the access point 103, and, along therewith, displays a QR Code® 506 in which these pieces of information are embedded. The information required for the Wi-Fi® infrastructure connection is, for example, the IP address of the MFP 102, but is not limited thereto.

For example, in the case of the Wi-Fi® direct connection, the mobile terminal 101 can automatically acquire the SSID and the key by reading out the QR Code® 503, and hand over the connection to the Wi-Fi® direct network to be brought into a state communicable with the MFP 102.

In the case of the Wi-Fi® infrastructure connection, the mobile terminal 101 can automatically acquire the IP address of the MFP 102 by reading out the QR Code® 506, and be paired with the MFP 102 to determine the connection destination.

As long as the Bluetooth® I/F 205 is ready to be used on the MFP 102, the mobile terminal 101 can acquire the same information as the information acquirable from the above-described QR Code® 503 or 506 using the Bluetooth® Low Energy communication function of the mobile terminal 101, and carry out the Wi-Fi® connection.

<Transmission Screen of MFP 102>

Figure 11A:
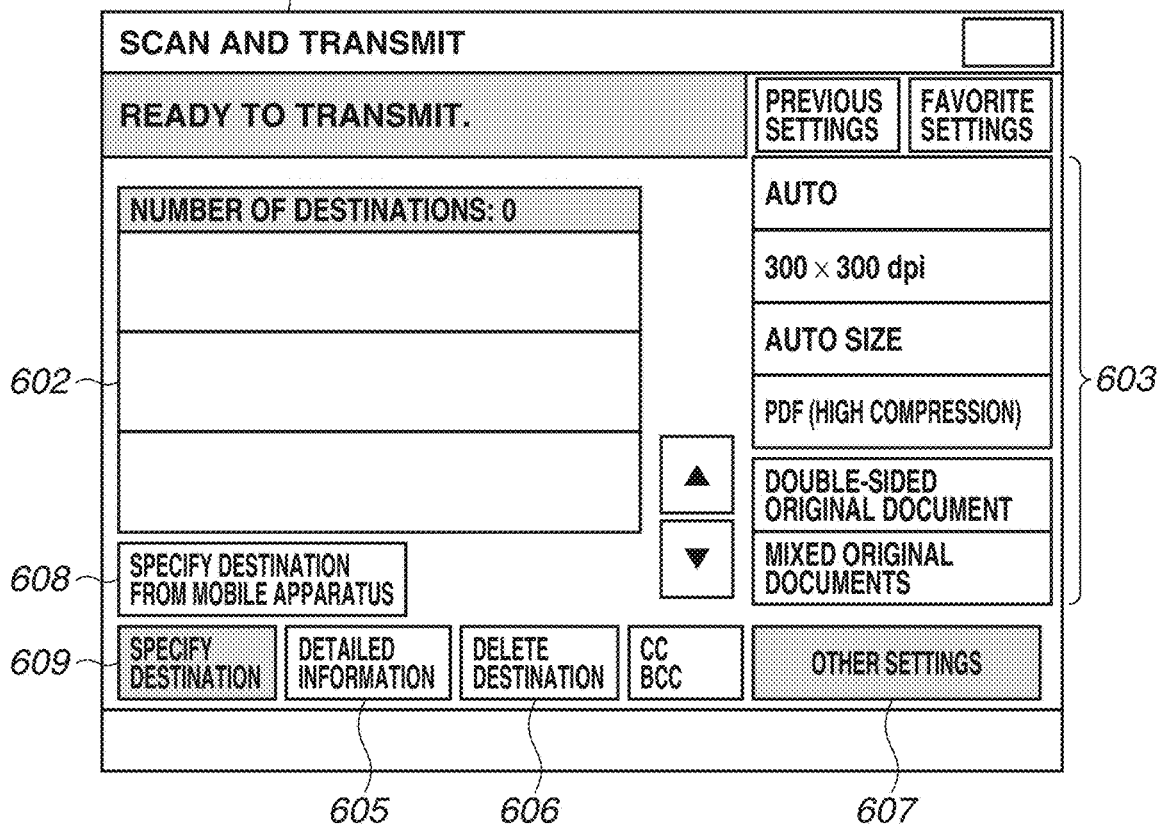
FIGS. 11A and 11B illustrate an example of a transmission screen of the MFP.
Figure 11B:
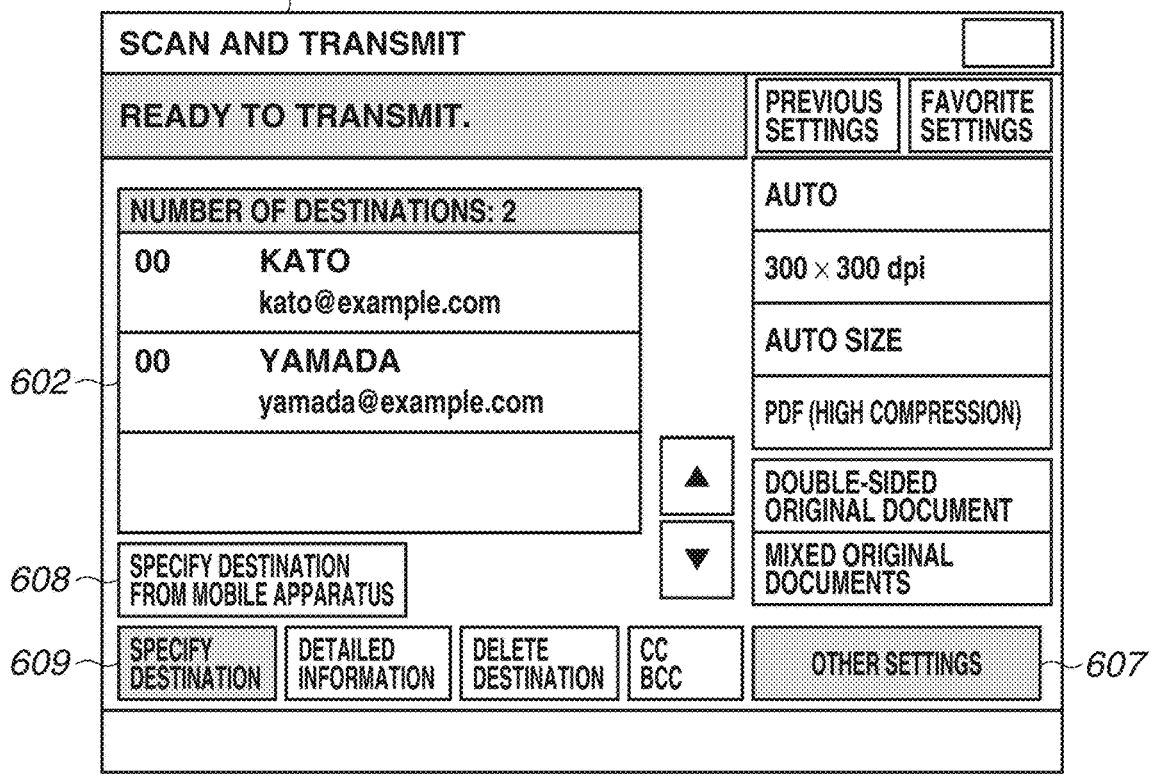

FIGS. 11A and 11B illustrate one example of the transmission screen 601 of the MFP 102.

FIG. 11A corresponds to a display example of the screen before the destination is set on the transmission screen 601 of the MFP 102. For example, the user presses the transmission button 707 illustrated in FIG. 9 to display the screen.

In FIGS. 11A and 11B, the transmission screen 601 is a screen for configuring destination and scan settings. A destination set as the transmission destination is displayed in the form of a list in a destination list 602. The destination is an address of an E-mail, facsimile (FAX), a server, or the like. The display example illustrated in FIG. 11A indicates the destination list 602 with the transmission destination not yet set therein. When the user presses a destination specifying button 609, the screen transitions to an address book screen 614 illustrated in FIG. 13, which enables the user to select a destination from destinations registered with an address book of the MFP 102 to add the selected destination to the destination list 602.

Scan setting buttons 603 enable the user to change the scan settings.

When a detailed information button 605 is pressed, the MFP 102 causes the screen to transition to a screen where detailed information of the selected destination is displayed. When a destination deletion button 606 is pressed, the MFP 102 can delete the selected destination. When an other settings button 607 is pressed, the MFP 102 displays a screen presenting a menu list of changes in the contents of the transmission (not illustrated). When the button 608 for specifying the destination from the mobile apparatus is pressed, the MFP 102 causes the screen to transition to the mobile portal screen 501 illustrated in FIG. 10A or 10B.

<Transmission Screen when Destination Data is Received>

Next, a screen of the MFP 102 after the data is received from the mobile terminal 101 via the Wi-Fi® communication will be described with reference to FIGS. 11B and 12.

FIG. 11B corresponds to a display example of the screen after the destination is set on the transmission screen 601 of the MFP 102.

When receiving the data from the mobile terminal 101 via the wireless LAN, the MFP 102 displays the E-mail address contained in the received data in the destination list 602 on the transmission screen 601 as illustrated in FIG. 11B. At this time, the subject, the message body, the filename, and the like contained in the received data are not displayed on the transmission screen 601. However, the user can confirm and correct the received transmission settings by selecting respective transmission setting functions from the screen presenting the menu list of changes in the contents of the transmission (not illustrated), which is displayed by pressing the other settings button 607.

Figure 12:
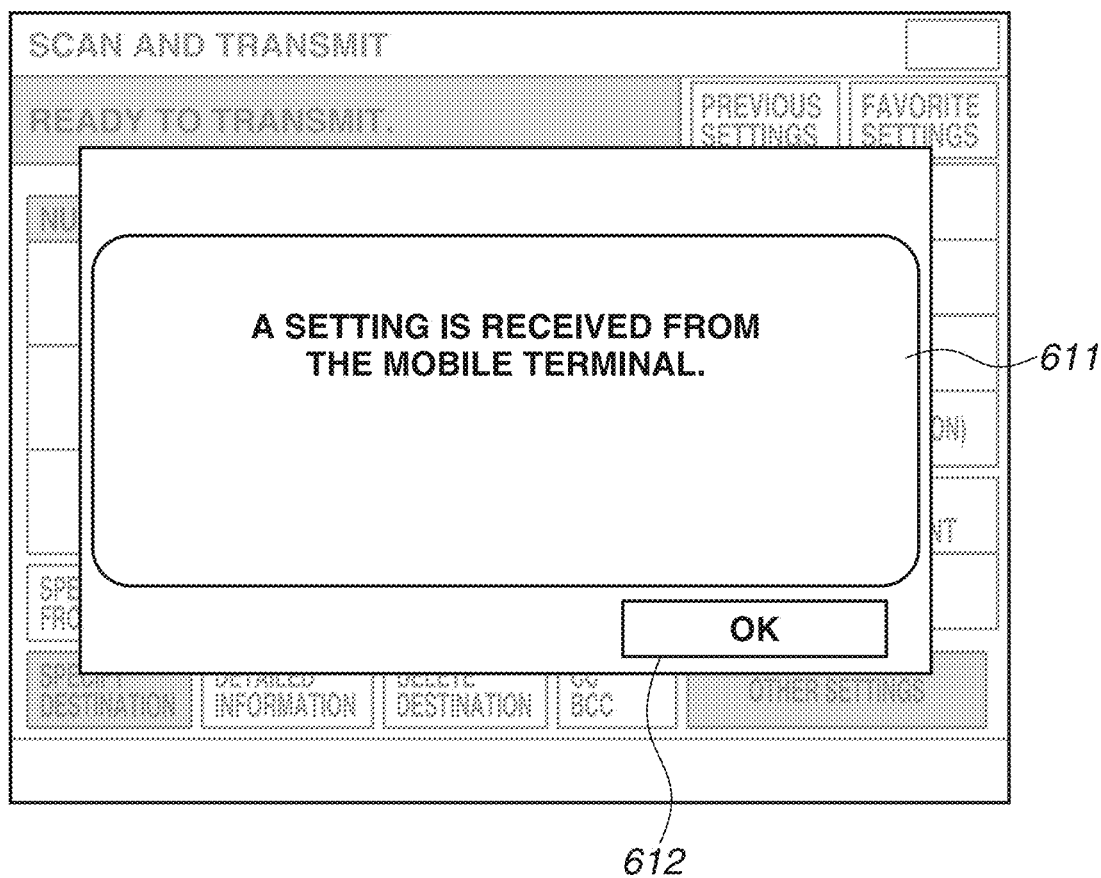
FIG. 12 illustrates an example of a pop-up screen displayed on the MFP when data is received from the mobile terminal.

When receiving the data from the mobile terminal 101 via the Wi-Fi® communication, the MFP 102 displays a pop-up notifying the user that the data is received from the mobile terminal 101, like an example illustrated in FIG. 12.

FIG. 12 illustrates one example of the pop-up displayed immediately after the setting of the E-mail transmission from the mobile terminal 101 is reflected on the transmission screen 601 of the MFP 102.

In FIG. 12, a message field 611 is a field for notifying the user that the data is received from the mobile apparatus. When the user presses an OK button 612, the MFP 102 closes the pop-up including the message field 611, and displays the transmission screen 601 illustrated in FIG. 11B.

<Address Book Screen of MFP 102>

Figure 13:
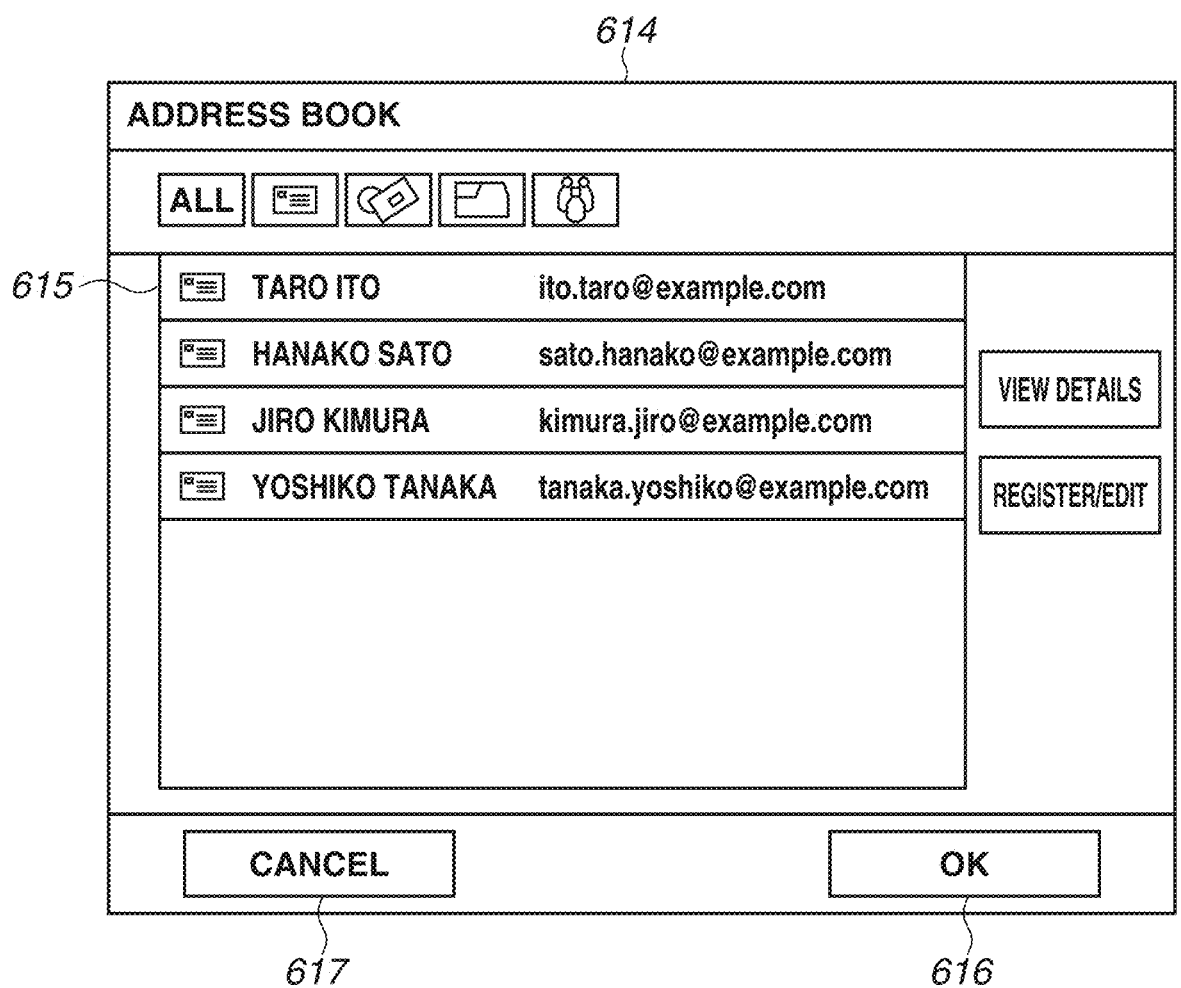
FIG. 13 illustrates an example of an address book screen of the MFP.

FIG. 13 illustrates one example of the address book screen 614 of the MFP 102. The user presses the destination specifying button 609, by which this screen is displayed.

A destination display field 615, which displays the destinations registered with the address book held in the HDD 213 of the MFP 102, is prepared on the address book screen 614, and one or more destination(s) can be selected therefrom. When the user presses an OK button 616, the MFP 102 closes the address book screen 614, and sets the destination selected from the destination display field 615 into the destination list 602 on the transmission screen 601 as illustrated in FIG. 11B. When the user presses a cancel button 617, the MFP 102 closes the address book screen 614, and does not update the destination list 602 on the transmission screen 601.

<Processing of Destination Transmission Function on Mobile Terminal 101 Side>

Figure 14B:
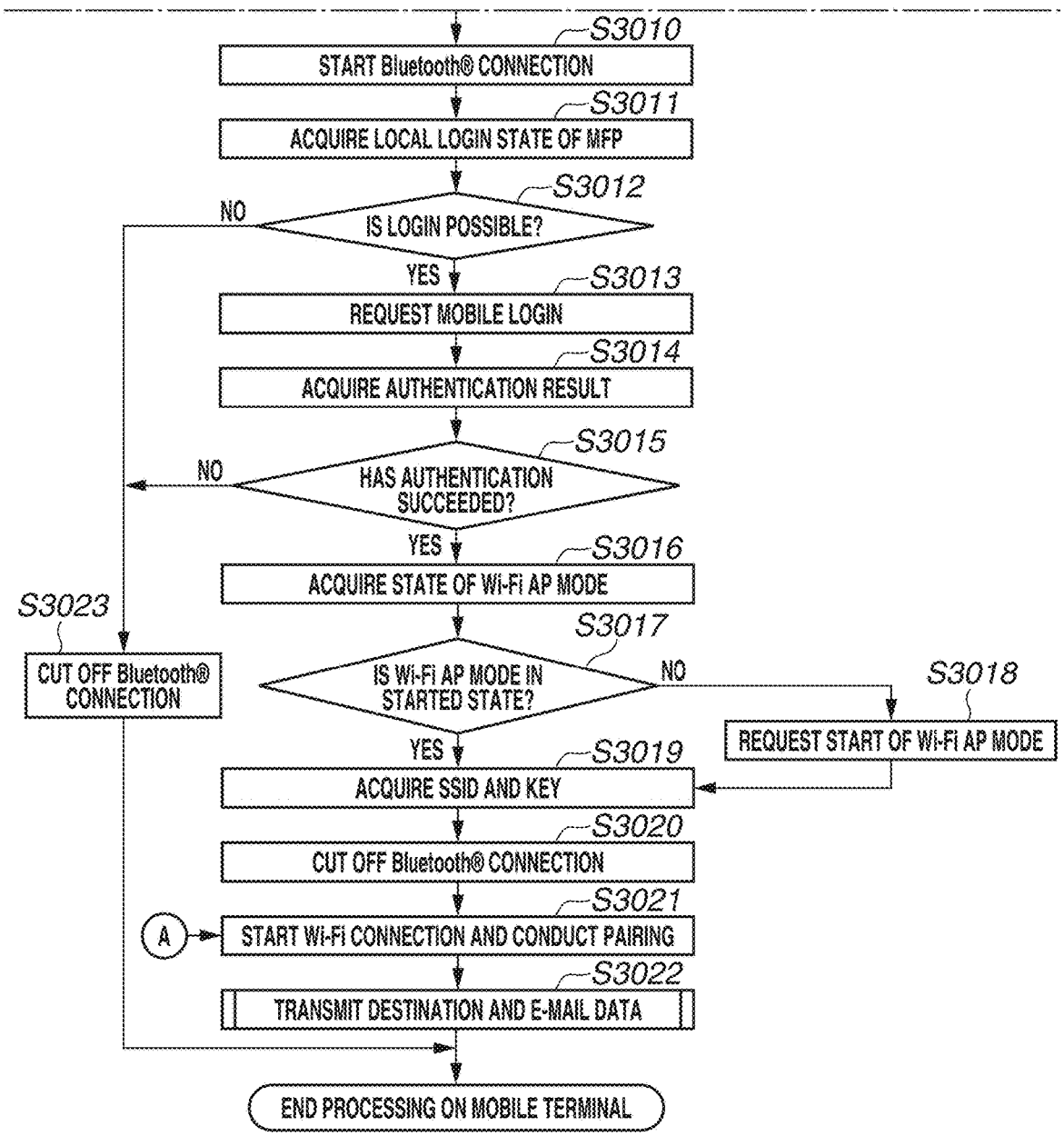
FIGS. 14 (14A and 14B) is a flowchart illustrating an example of processing of a destination transmission function on the mobile terminal side.

FIG. 14 (14A and 14B) is a flowchart illustrating one example of processing of the destination transmission function on the mobile terminal 101 according to the first exemplary embodiment. The CPU 307 executes the application 900 under the control by the platform 902, by which a series of processes illustrated in the flowchart of FIG. 14 (14A and 14B) and a flowchart of FIG. 15, which will be described below, is realized. In the following description, processing performed by the application 900 executed by the CPU 307 will be described assuming that the application 900 serves as a performer thereof. Further, processing performed by the platform 902 executed by the CPU 307 will be described assuming that the platform 902 serves as a performer thereof.

In step S3000, upon detecting an input into each of the fields for inputting the E-mail addresses (441, 447, and 448 illustrated in FIG. 8) and the fields for inputting the mail information, such as the subject, the filename, and the message body (442, 444, and 443 illustrated in FIG. 8) on the operation panel 301, the application 900 stores the input data into the RAM 309.

Next, in step S3001, the application 900 detects that the button 445 for transmitting the data to the printer (FIG. 8) is pressed on the operation panel 301. Upon this detection, the processing proceeds to step S3002.

In step S3002, the application 900 starts receiving radio waves of the Bluetooth® Low Energy communication. More specifically, to receive the radio waves, the application 900 first requests the platform 902 to receive the radio waves of the Bluetooth® Low Energy communication. Then, the platform 902 controls the Bluetooth® I/F 306 using the Bluetooth® control unit 903 to start receiving the radio waves of the Bluetooth® Low Energy communication. The application 900 starts receiving the radio waves of the Bluetooth® Low Energy communication in this manner. The platform 902 transfers an advertising packet of Bluetooth® that is received during this started reception of the radio waves of the Bluetooth® Low Energy communication to the application 900. Then, the application 900 analyzes this received advertising packet.

Next, in step S3003, the application 900 determines whether the information of Local Name and Manufacturer Specific Data is contained in the advertising packet received in the above-described step S3002, and the MFP 102 corresponding to the destination transmission is discovered. In other words, the application 900 determines whether the MFP 102 is discovered from a Bluetooth® Low Energy search. If the application 900 determines that the MFP 102 is discovered from the Bluetooth® Low Energy search (YES in step S3003), the processing proceeds to step S3006.

In step S3006, the application 900 displays a list of MFPs 102 discovered from the above-described Bluetooth® Low Energy search on the operation panel 301.

Next, in step S3007, the application 900 detects that one MFP 102 is selected from the displayed MFPs 102. Upon this detection, the processing proceeds to step S3008.

The mobile terminal 101 can be configured to, if only one MFP 102 is discovered from the above-described Bluetooth® Low Energy search, determine that this MFP 102 is the MFP 102 corresponding to the destination of the transmission without the user inputting the operation of selecting the MFP 102. Alternatively, the mobile terminal 101 can be configured to register the MFP 102 corresponding to the destination of the data transmission with the mobile terminal 101 (store this MFP 102 in the flash memory 310) in advance, and, if the registered MFP 102 is discovered from the Bluetooth® Low Energy search, determine that this MFP 102 is the MFP 102 corresponding to the destination of the transmission without the user inputting the operation of selecting the MFP 102. These configurations enable the application 900 to omit the processes in the above-described steps S3006 and S3007, i.e., the user's operation of selecting the MFP 102.

In step S3008, the application 900 determines whether the distance between the mobile terminal 101 and the MFP 102 selected in the above-described step S3007 is a distance for which the data transmission is possible. The application 900 makes this determination by determining whether the value of the RSSI of received Bluetooth® Low Energy is lower than a threshold value stored in the flash memory 310 (−50 dBm in the case of the example indicated in the table 5). If the value of the RSSI is less than the threshold value, the application 900 determines that this distance is the distance for which the data transmission is possible (YES in step S3008). If the value of the RSSI is the greater than or equal to the threshold value, the application 900 determines that this distance is not the distance for which the data transmission is possible (NO in step S3008).

If the application 900 determines that the distance between the mobile terminal 101 and the MFP 102 is not the distance for which the data transmission is possible in the above-described step, (NO in step S3008), the processing proceeds to step S3009. In step S3009, the application 900 displays a message prompting the user to move closer to the MFP 102. Then, the processing returns to step S3008.

If the application 900 determines that the distance between the mobile terminal 101 and the MFP 102 is the distance for which the data transmission is possible in the above-described step S3008 (YES in step S3008), the processing proceeds to step S3010.

In this manner, only the user of the mobile terminal 101 who stays within the distance less than the threshold value (the distance less than 50 cm in the present exemplary embodiment) can log into the MFP 102 in step S3010 and steps subsequent thereto, which can guarantee that the login user stays in front of (close to) the MFP 102. This is one of merits brought about from the use of the Bluetooth® Low Energy communication.

In step S3010, the application 900 starts GATT communication of Bluetooth® Low Energy via the Bluetooth® I/F 306, e.g., Bluetooth® Low Energy connection. More specifically, to start the Bluetooth® Low Energy communication, the application 900 first requests the platform 902 to start the Bluetooth® Low Energy communication with the MFP 102. Then, the platform 902 controls the Bluetooth® I/F 306 using the Bluetooth® control unit 903 to start the Bluetooth® Low Energy communication with the MFP 102.

Next, in step S3011, the application 900 acquires the local login status of the MFP 102 via the Bluetooth® Low Energy communication. More specifically, the application 900 requests the platform 902 to acquire the local login status of the MFP 102 by accessing the user authentication service 1000 published by the MFP 102 via the Bluetooth® Low Energy communication and acquiring the value of the characteristic indicating the local login condition (StatusID 1001 illustrated in FIG. 5). Then, the platform 902 acquires the local login status of the MFP 102 by controlling the Bluetooth® I/F 306 using the Bluetooth® control unit 903 to access the user authentication service 1000 of the MFP 102 via the Bluetooth® Low Energy communication and acquire the value of StatusID 1001, and transfers the acquired local login status to the application 900. The application 900 acquires the local login condition of the MFP 102 via the Bluetooth® Low Energy communication in this manner.

Next, in step S3012, the application 900 compares the value of StatusID 1001 indicating the local login status of the MFP 102 that has been acquired in the above-described step S3011 with the value indicated in the table 2, and determines whether the MFP 102 is in the status where the login thereto is possible.

If the application 900 determines that the MFP 102 is not in the status where the login thereto is possible (NO in step S3012), the processing proceeds to step S3023, in which the application 900 cuts off the Bluetooth® Low Energy communication. More specifically, to cut off the Bluetooth® Low Energy communication, the application 900 first requests the platform 902 to cut off the Bluetooth® Low Energy communication with the MFP 102. Then, the platform 902 controls the Bluetooth® I/F 306 using the Bluetooth® control unit 903 to cut off the Bluetooth® Low Energy communication with the MFP 102. The application 900 cuts off the Bluetooth® Low Energy communication in this manner. After cutting off the Bluetooth® Low Energy communication, the application 900 ends the processing according to the present flowchart.

If the application 900 determines that the MFP 102 is in the status where the login thereto is possible in the above-described step S3012 (YES in step S3012), the processing proceeds to step S3013.

In step S3013, the application 900 issues the mobile login request to the MFP 102 via the Bluetooth® Low Energy communication using the values read out from the authentication information 901 (FIG. 4B) stored in the flash memory 310. More specifically, the application 900 requests the platform 902 to write the values read out from the above-described authentication information 901 (FIG. 4B) via the Bluetooth® Low Energy communication into the characteristics UserName 1002 and Password 1003. The application 900 requests the platform 902 to write the value indicating the login request that is listed in the table 6 into the characteristic RequestID 1004 via the Bluetooth® Low Energy communication. The application 900 requests the platform 902 to request the execution of the local login to the MFP 102 via the Bluetooth® Low Energy communication by performing such processing. Then, the platform 902 controls the Bluetooth® I/F 306 using the Bluetooth® control unit 903 to write the values into UserName 1002 and Password 1003. Further, the platform 902 controls the Bluetooth® I/F 306 using the Bluetooth® control unit 903 to write the value indicating the login request that is listed in the table 6 into RequestID 1004. The platform 902 requests the execution of the local login to the MFP 102 via the Bluetooth® Low Energy communication by performing such processing. The application 900 issues the mobile login request to the MFP 102 in this manner. When the authentication processing is performed on the MFP 102 side according to this request, and a result thereof is written into the characteristic ResultID 1005 (FIG. 5), the application 900 is notified by Notification in ATT. The application 900 is notified of this notification via the Bluetooth® I/F 306 and the platform 902.

In step S3014, according to this notification, the application 900 acquires the authentication result corresponding to the mobile login request issued in the above-described step S3013 from the MFP 102 via the Bluetooth® Low Energy communication. More specifically, the application 900 requests the platform 902 to acquire the authentication result corresponding to the mobile login request by accessing the user authentication service 1000 published by the MFP 102 via the Bluetooth® Low Energy communication and acquiring the value of the characteristic indicating the authentication result (ResultID 1005 illustrated in FIG. 5). Then, the platform 902 acquires the authentication result by controlling the Bluetooth® I/F 306 using the Bluetooth® control unit 903 to access the user authentication service 1000 via the Bluetooth® Low Energy communication and acquire the value of ResultID 1005, and transfers the acquired authentication result to the application 900. The application 900 acquires the authentication result corresponding to the mobile login request issued in the above-described step S3013 in this manner.

Next, in step S3015, the application 900 determines the authentication result acquired in the above-described step S3014. Then, if the application 900 determines that the authentication has failed (NO in step S3015), the processing proceeds to step S3023, in which the application 900 cuts off the Bluetooth® Low Energy communication, and then ends the processing.

If the application 900 determines that the authentication has succeeded in the above-described step S3015 (YES in step S3015), the processing proceeds to step S3016.

In step S3016, the application 900 acquires the status of the Wi-Fi® AP mode of the MFP 102 via the Bluetooth® Low Energy communication. More specifically, the application 900 requests the platform 902 to acquire the status of the Wi-Fi® AP mode of the MFP 102 by accessing the Wi-Fi® AP mode start/stop service 1006 published by the MFP 102 via the Bluetooth® Low Energy communication and acquiring the value of the characteristic indicating the status of the Wi-Fi® AP mode (Status 1007 illustrated in FIG. 5). Then, the platform 902 acquires the status of the Wi-Fi® AP mode of the MFP 102 by controlling the Bluetooth® I/F 306 using the Bluetooth® control unit 903 to access the Wi-Fi® AP mode start/stop service 1006 via the Bluetooth® Low Energy communication and acquire the value of Status 1007, and transfers the acquired status of the Wi-Fi® AP mode of the MFP 102 to the application 900. The application 900 acquires the status of the Wi-Fi® AP mode of the MFP 102 in this manner.

Next, in step S3017, the application 900 determines whether the Wi-Fi® AP mode of the MFP 102 is in the started status based on the result of the acquisition in the above-described step S3016. Then, if the application 900 determines that the Wi-Fi® AP mode is not in the started status (the Wi-Fi® AP mode is in the stopped status) (NO in step S3017), the processing proceeds to step S3018.

In step S3018, the application 900 requests the start of the Wi-Fi® AP mode to the MFP 102 via the Bluetooth® Low Energy communication. More specifically, the application 900 requests the platform 902 to request the start of the Wi-Fi® AP mode to the MFP 102 by accessing the Wi-Fi® AP mode start/stop service 1006 published by the MFP 102 via the Bluetooth® Low Energy communication and writing the value indicating the start into Status 1007. Then, the platform 902 requests the start of the Wi-Fi® AP mode to the MFP 102 by controlling the Bluetooth® I/F 306 using the Bluetooth® control unit 903 to access the Wi-Fi® AP mode start/stop service 1006 via the Bluetooth® Low Energy communication and write the value indicating the start into Status 1007. The application 900 requests the start of the Wi-Fi® AP mode to the MFP 102 in this manner. After the application 900 performs the process in the above-described step S3018, the processing proceeds to step S3019.

If the application 900 determines that the Wi-Fi® AP mode is in the started status (YES in step S3017), the processing proceeds directly to step S3019.

In step S3019, the application 900 acquires the values of the information required for the Wi-Fi® connection to the MFP 102 (the SSID, the key, the direct IP address, the direct MAC address, and the like) via the Bluetooth® Low Energy communication. More specifically, the application 900 requests the platform 902 to access the Wi-Fi® connection information acquisition service 1008 published by the MFP 102 via the Bluetooth® Low Energy communication and acquire the values of the characteristics indicating the information required for the Wi-Fi® connection (SSID 1011, KEY 1012, Direct IP Address 1013, and Direct MAC Address 1014). Then, the platform 902 controls the Bluetooth® I/F 306 using the Bluetooth® control unit 903 to access the Wi-Fi® connection information acquisition service 1008 via the Bluetooth® Low Energy communication and acquire the values of SSID 1011, KEY 1012, Direct IP Address 1013, and Direct MAC Address 1014, and transfers the acquired values to the application 900. The application 900 acquires the values of the information required for the Wi-Fi® connection to the MFP 102 (the SSID, the key, the direct IP address, the direct MAC address, and the like) in this manner.

Next, in step S3020, the application 900 cuts off the Bluetooth® Low Energy communication. Details thereof are similar to the above-described step S3023, and therefore will be omitted here.

In step S3021, the application 900 starts the connection of the direct Wi-Fi® communication with the MFP 102 using the information acquired in the above-described step S3019. More specifically, the application 900 requests the platform 902 to start the connection of the direct Wi-Fi® communication to the MFP 102 using the information acquired in the above-described step S3019. Then, the platform 902 controls the wireless LAN I/F 311 using the wireless network control unit 904 to start the connection of the direct Wi-Fi® communication with the MFP 102. Then, the application 900 pairs the mobile terminal 101 with the above-described acquired address, Direct IP Address 1013.

Upon completion of the above-described pairing, the processing proceeds to step S3022, in which the application 900 remotely logs into the MFP 102 using the wireless LAN I/F 311, i.e., via the Wi-Fi® communication, and transmits the data such as the destination and the subject stored into the RAM 309 in the above-described step S3000 to the MFP 102. Details of step S3022 will be described below with reference to FIG. 15. In this manner, the application 900 performs control so as to log into the MFP 102 by the mobile login (step S3013) according to detecting that the transmission button 445 is pressed (step S3001), and transmit the above-described data to the MFP 102 using the Wi-Fi® communication (step S3022) based on the success in this mobile login without receiving an instruction to transmit the data from the user after the success in the mobile login. After the process in step S3022, the application 900 ends the processing according to the present flowchart.

Further, if the application 900 determines that the MFP 102 is not discovered from the Bluetooth® Low Energy search in the above-described step S3003 (NO in step S3003), the processing proceeds to step S3004, in which the application 900 starts up the camera 304.

Next, in step S3005, the application 900 reads out the QR Code® 503 displayed on the mobile portal screen 501 (FIG. 10A) of the MFP 102 using the camera 304, and decodes a content thereof. Then, in step S3024, the application 900 acquires the Wi-Fi® connection information contained in the data decoded in the above-described step S3005. Then, the processing proceeds to step S3021. The processes in step S3021 and the subsequent step have already been described above, and therefore a description thereof will be omitted here.

Next, the details of the process performed in step S3022 illustrated in FIG. 14 (14A and 14B) will be described with reference to FIG. 15.

FIG. 15 is a flowchart illustrating the details of the process performed in step S3022 illustrated in FIGS. 14 (14A and 14B).

In step S1021, the application 900 acquires the authentication information 901 set from the application setting button 412 (FIG. 7) and stored in the flash memory 310, and transmits the remote login request to the MFP 102 via the Wi-Fi® communication using the authentication information 901. More specifically, the application 900 requests the platform 902 to transmit the remote login request using the authentication information 901 to the MFP 102 via the Wi-Fi® communication. Then, the platform 902 controls the wireless LAN I/F 311 using the wireless network control unit 904 to transmit the remote login request using the authentication information 901 to the MFP 102 via the Wi-Fi® communication. If the remote login succeeds, the MFP 102 generates a session ID so that the application 900 acquires this session ID via the platform 902. If the remote login fails, the processing proceeds again to step S1021 (not illustrated).

Next, in step S1023, the application 900 transmits the data such as the destination and the subject stored into the RAM 309 in step S3000 illustrated in FIGS. 14 (14A and 14B), to the MFP 102 via the Wi-Fi® communication. More specifically, the application 900 requests the platform 902 to transmit the above-described data to the MFP 102 via the Wi-Fi® communication. Then, the platform 902 controls the wireless LAN I/F 311 using the wireless network control unit 904 to transmit the above-described data to the MFP 102 via the Wi-Fi® communication. In this process in step S1023, the application 900 performs control so as to also transmit the username contained in the authentication information 901 and the session ID acquired in the above-described step S1021 along therewith. The username and session ID are used to exclude a data transmission request from another user on the MFP 102 side. Details thereof will be described with reference to FIG. 17. When receiving a response to the data transmission from the MFP 102, the platform 902 transfers this response to the application 900.

Next, in step S1024, the application 900 receives the response to the data transmission, and determines whether the data transmission has succeeded. Then, if the application 900 determines that the data transmission has succeeded (YES in step S1024), the processing proceeds to step S1025.

In step S1025, the application 900 clears the inputs on the E-mail transmission setting screen 480, and causes the screen to transition to the application menu screen 406. The application 900 can display a pop-up indicating that the data transmission has succeeded when the screen transitions.

Next, in step S1026, the application 900 determines whether the MFP 102 to which the data has been transmitted is already stored in the flash memory 310 of the mobile terminal 101. Then, if the application 900 determines that this MFP 102 is not yet stored (NO in step S1026), in step S1027, the application 900 stores the information such as the MAC address of the MFP 102 to which the data has been transmitted into the flash memory 310, and then ends the processing according to the present flowchart.

If the application 900 determines that this MFP 102 is already stored in the above-described step S1026 (YES in step S1026), the application 900 ends the processing according to the present flowchart without newly storing the MFP 102.

If the application 900 determines that the data transmission has failed in the above-described step S1024 (NO in step S1024), in step S1028, the application 900 displays an error message on the operation panel 301, and then ends the processing according to the present flowchart while maintaining the inputs on the destination transmission screen 480.

<Processing of Destination Transmission Function on MFP 102 Side>

Figure 16:
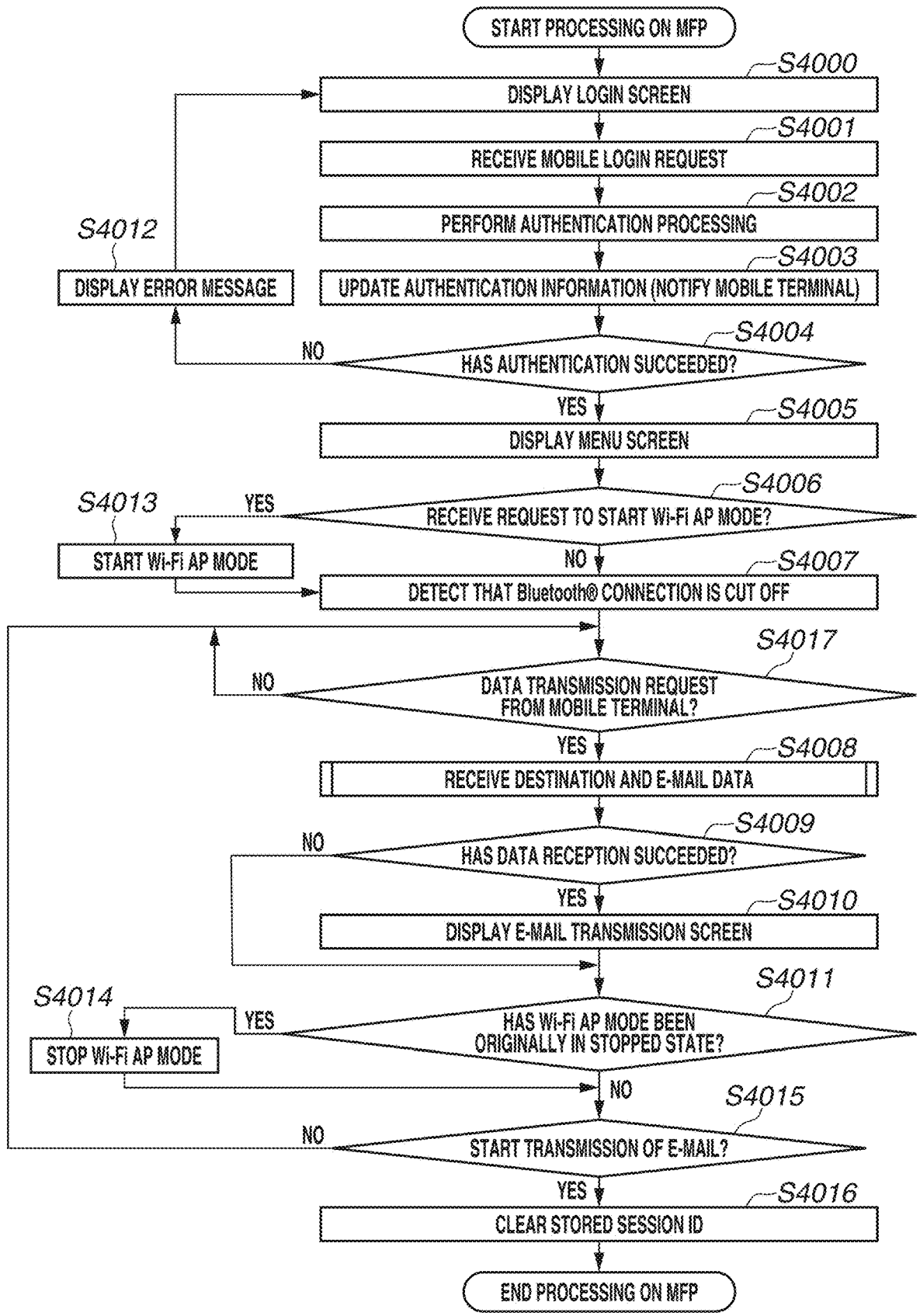
FIG. 16 is a flowchart illustrating an example of processing of the destination transmission function on the MFP side.

FIG. 16 is a flowchart illustrating one example of processing on the MFP 102 side when the destination transmission function is used with the MFP 102 according to the first exemplary embodiment in the state where no one is logged into the MFP 102. The CPU 201 of the MFP 102 executes a program executable by the MFP 102 in which a procedure that will be described below is written after reading out this program from the ROM 202 into the RAM 203, by which a series of processes illustrated in FIG. 16 and FIG. 17, which will be described below, is realized.

First, in step S4000, the CPU 201 of the MFP 102 displays the login screen 701 on the display 211.

Next, in step S4001, the CPU 201 detects via the Bluetooth® I/F 205 that the mobile terminal 101 has written the value indicating the login request listed in the table into the characteristic RequestID 1004 in the user authentication service 1000 via the Bluetooth® Low Energy communication (receives the mobile login request). Upon this detection, the processing proceeds to step S4002.

In step S4002, the CPU 201 reads out the values of UserName 1002 and Password 1003, which are the characteristics in the same service, and the login service 804 determines whether there is data that matches the user authentication information registered with the user account 805, thereby performing the authentication processing.

Next, in step S4003, the CPU 201 notifies the mobile terminal 101 of the authentication result by writing the result of the authentication in the above-described step S4002 into ResultID 1005 in the user authentication service 1000. At this time, the Bluetooth® control unit 807 notifies the currently connected mobile terminal 101 of the change in the value of the authentication result by Notification in ATT. If the authentication succeeds at this time, the CPU 201 stores the username of the user account that matches the registered user authentication information into the RAM 203 or the like. The stored username is used in step S2014 (FIG. 17), which will be described below.

Next, in step S4004, the CPU 201 determines whether the authentication has succeeded. Then, if the CPU 201 determines that the authentication has failed (NO in step S4004), the processing proceeds to step S4012, in which the CPU 201 displays an error message on the display 211. Then, the processing returns to step S4000.

If the CPU 201 determines that the authentication has succeeded (YES in step S4004), the processing proceeds to step S4005, in which the CPU 201 displays the menu screen 705 on the display 211. If the authentication succeeds, the CPU 201 sets the MFP 102 into a mobile login status, thereby setting the MFP 102 into the status capable of receiving the transmission of the data from the mobile terminal 101, although this is not illustrated. If the authentication fails, the status of the MFP 102 does not transition to the mobile login status, and the menu screen 705 is not displayed. In other words, the MFP 102 is kept in the status incapable of receiving the transmission of the data from the mobile terminal 101. The login service 804 also changes the value of StatusID 1001 in the user authentication service 1000. Although not illustrated in FIG. 16, the MFP 102 provides the authentication result to the mobile terminal 101 or the like by the user authentication service 1000. As discussed in the description of step S3014 illustrated in FIGS. 14 (14A and 14B), the mobile terminal 101 acquires the authentication result (ResultID 1005) from the MFP 102 using the user authentication service 1000.

Next, in step S4006, the CPU 201 determines whether the request to start the Wi-Fi® AP mode is received from the mobile terminal 101 via the Bluetooth® Low Energy communication. In the determination, the CPU 201 determines that the request to start the Wi-Fi® AP mode is received (YES in step S4006) if detecting via the Bluetooth® I/F 205 that the value indicating the start of the Wi-Fi® AP mode is written in the characteristic Status 1007 in the Wi-Fi® AP mode start/stop service 1006. The CPU 201 determines that the request to start the Wi-Fi® AP mode is not received (NO in step S4006) if not detecting the update of the value of Status 1007. Although not illustrated in FIG. 16, the MFP 102 provides the started status of the Wi-Fi® AP mode to the mobile terminal 101 or the like by the Wi-Fi® AP mode start/stop service 1006. As discussed in the description of step S3016 illustrated in FIG. 14 (14A and 14B), the mobile terminal 101 acquires the started status or the like of the Wi-Fi® AP mode from the MFP 102 using the Status 1007 in the Wi-Fi® AP mode start/stop service 1006. Then, as discussed in the description of step S3018 illustrated in FIG. 14 (14A and 14B), the mobile terminal 101 issues the request to start the Wi-Fi® AP mode if the Wi-Fi® AP mode is not in the started status on the MFP 102.

If the CPU 201 determines that the request to start the Wi-Fi® AP mode is received from the mobile terminal 101 via the Bluetooth® Low Energy communication in the above-described step S4006 (YES in step S4006), the processing proceeds to step S4013.

In step S4013, the CPU 201 starts the Wi-Fi® AP mode with use of the wireless LAN I/F 206. When performing this process, the CPU 201 temporarily stores whether the original value of Status 1007 is the value indicating the stop into the RAM 203. After the CPU 201 performs the process in step S4013, the processing proceeds to step S4007.

If the CPU 201 determines that the request to start the Wi-Fi® AP mode is not received from the mobile terminal 101 via the Bluetooth® Low Energy communication in the above-described step S4006 (NO in step S4006), the processing proceeds directly to step S4007.

In step S4007, upon detecting via the Bluetooth® I/F 205 that the Bluetooth® Low Energy communication is cut off, the CPU 201 ends the Bluetooth® communication. Although not illustrated in FIG. 16, the MFP 102 provides the information required for the Wi-Fi® connection, such as the SSID and the key, to the mobile terminal 101 or the like by the Wi-Fi® connection information acquisition service 1008. As discussed in the description of step S3019 illustrated in FIG. 14 (14A and 14B), the mobile terminal 101 acquires the SSID, the key, and the like from the MFP 102 using the Wi-Fi® connection information acquisition service 1008 before the Bluetooth® Low Energy communication is cut off. Then, as discussed in the description of step S3021 illustrated in FIG. 14 (14A and 14B), the mobile terminal 101 starts the connection of the direct Wi-Fi® communication with the MFP 102 using the above-described acquired SSID, key, and the like, for example, after the Bluetooth® Low Energy communication is cut off.

Next, in step S4017, the CPU 201 detects the data transmission request from the mobile terminal 101 via the wireless LAN I/F 206 or the network I/F 207. Then, if the CPU 201 determines that the data transmission request is not received (NO in step S4017), the processing proceeds again to step S4017.

If the CPU 201 determines that the data transmission request is received (YES in step S4017), the processing proceeds to step S4008.

In step S4008, the CPU 201 receives the remote login request and receives the data such as the destination and the subject from the mobile terminal 101. Details of step S4008 will be described below with reference to FIG. 17.

Next, in step S4009, the CPU 201 determines whether the data reception processing in the above-described step S4008 has succeeded. If the CPU 201 determines that the data reception processing has succeeded (YES in step S4009), the processing proceeds to step S4010.

In step S4010, the CPU 201 displays the transmission screen 601 on the display 211 while displaying the message indicating that the destination data is received from the mobile terminal 101 in the message field 611 (FIG. 12). Then, the processing proceeds to step S4011.

If the CPU 201 determines that the data reception processing has failed in the above-described step S4009 (NO in step S4009), the CPU 201 returns an error to the mobile terminal 101 (not illustrated), and the processing proceeds directly to step S4011 without any change made to the display on the display 211.

In step S4011, the CPU 201 determines whether the Wi-Fi® AP mode has been originally in the stopped status. In the determination, if the original value of Status 1007 has been stored into the RAM 203 in the above-described step S4013 and the value is the value indicating the stop, the CPU 201 determines that the Wi-Fi® AP mode has been originally in the stopped status (YES in step S4011). If the value is not the value indicating the stop, the CPU 201 determines that the Wi-Fi® AP mode has not been originally in the stopped status (NO in step S4011).

Then, if the CPU 201 determines that the Wi-Fi® AP mode has been originally in the stopped status (YES in step S4011), the processing proceeds to step S4014. In step S4014, the CPU 201 writes the value indicating the stop into Status 1007 and instructs the wireless LAN I/F 206 to stop the AP mode, and to return the Wi-Fi® AP mode to the original status thereof. Then, the processing proceeds to step S4015.

If the CPU 201 determines that the Wi-Fi® AP mode has not been originally in the stopped status (NO in step S4011), the processing proceeds directly to step S4015.

In step S4015, the CPU 201 determines whether the input to start the transmission of the E-mail is detected on the operation panel 209. Then, if the CPU 201 determines that the input to start the transmission of the E-mail is not detected (NO in step S4015), the processing returns to step S4017.

If the CPU 201 determines that the input to start the transmission of the E-mail is detected (YES in step S4015), the processing proceeds to step S4016.

In step S4016, the CPU 201 clears the session ID stored in the above-described step S4008 (more specifically, step S2022, which will be described below with reference to FIG. 17), and then ends the processing according to the present flowchart. Although not illustrated in FIG. 16, if the input to start the transmission of the E-mail is detected (YES in step S4015), the CPU 201 performs the processing such as reading out the original document with use of the scanner 215 and transmitting the E-mail based on the destination and scan settings set on the transmission screen 601.

Next, the details of the process performed in step S4008 will be described with reference to FIG. 17.

Figure 17:
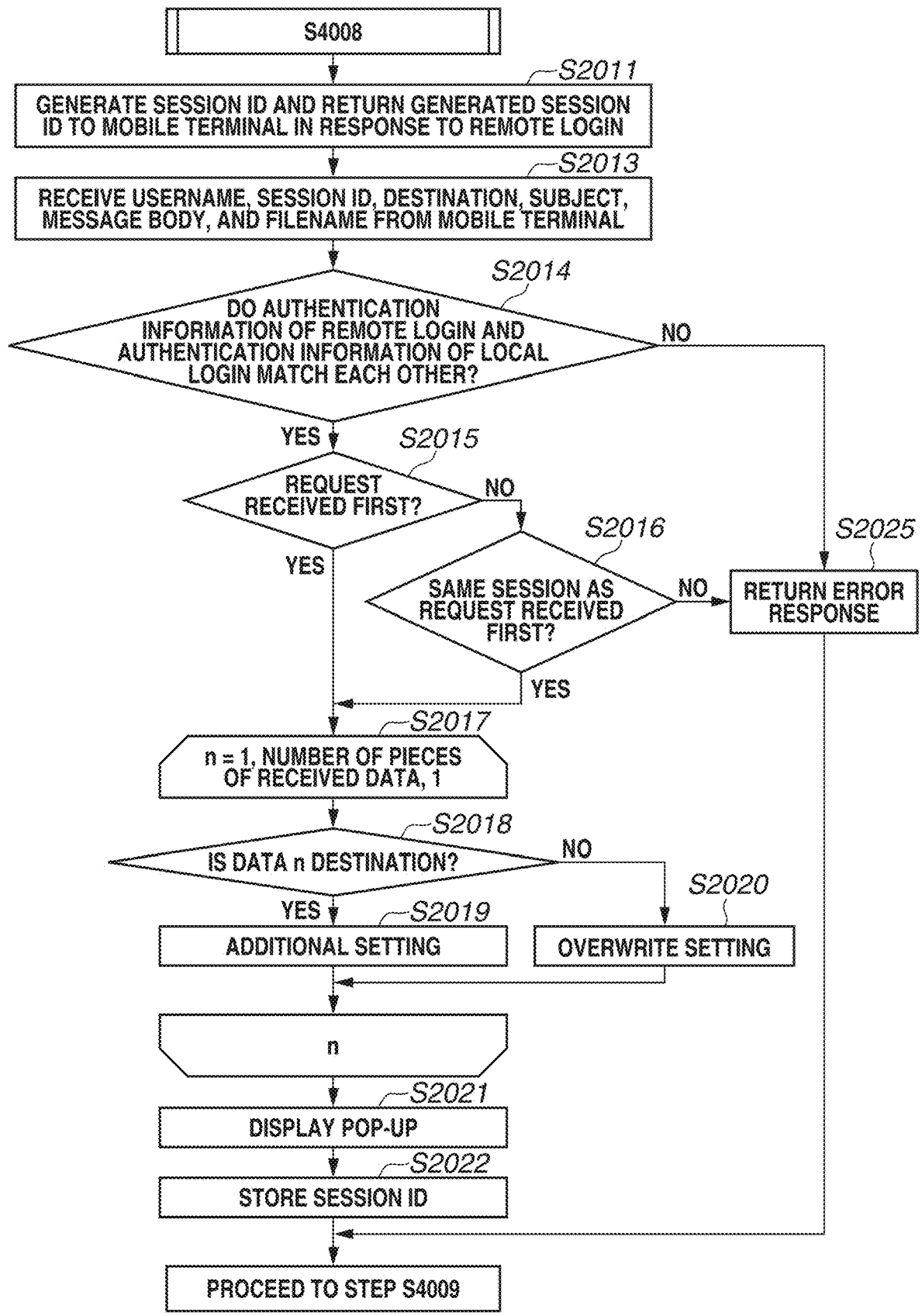
FIG. 17 is a flowchart exemplarily illustrating details of a process performed in step S4008 illustrated in FIG. 16.

FIG. 17 is a flowchart exemplarily illustrating the details of the process performed in step S4008 illustrated in FIG. 16.

In step S2011, upon detecting the remote login request from the mobile terminal 101 via the wireless LAN I/F 206 or the network I/F 207, the CPU 201 performs the remote login processing, generates the session ID, and transmits the generated session ID to the mobile terminal 101.

Next, in step S2013, the CPU 201 receives the data transmission request with respect to the destination and the like, which the mobile terminal 101 has transmitted in step S1023, via the wireless LAN I/F 206 or the network I/F 207. This data transmission request contains the username and the session ID as described in the description of step S1023 illustrated in FIG. 15.

Next, in step S2014, the CPU 201 determines whether the local login user authenticated in the above-described step S4002 (i.e., the username stored in step S4003 illustrated in FIG. 16) and the remote login user detected in the above-described step S2011 (i.e., the username received in the above-described step S2013) match each other, in the case where the MFP 102 conducts user management. This is a check for guaranteeing that the user who transmits the data, such as the destination from the mobile terminal 101, stays in front of the MFP 102. In other words, this is a check whether the user who has transmitted the data in the above-described step S1023 matches the user logged in by the keyboard login or the mobile login via the Bluetooth® Low Energy communication in step S3013 illustrated in FIG. 14 (14A and 14B). If the user registered with the mobile terminal 101 is locally logged into the MFP 102, the CPU 201 assumes that this user stays in front of the apparatus.

If the CPU 201 determines that the local login user and the remote login user do not match each other in the above-described step S2014 (NO in step S2014), the processing proceeds to step S2025. In step S2025, the CPU 201 returns an error response to the mobile terminal 101, and then ends the processing according to the present flowchart.

If the CPU 201 determines that the local login user and the remote login user match each other in the above-described step S2014 (YES in step S2014), the processing proceeds to step S2015. While not illustrated, the processing also proceeds to step S2015 in a case where the MFP 102 does not conduct the login management.

In steps S2015 and S2016, the CPU 201 checks the session ID contained in the data transmission request received in the above-described step S2013. This is processing for, until the E-mail transmission is started after some user transmits the data such as the destination from the mobile terminal 101, preventing the MFP 102 from accepting a data transmission request from another user. Next, details thereof will be described.

In step S2015, the CPU 201 determines whether the received request is a request received first. When accepting the request from the mobile terminal 101, the CPU 201 stores the session ID transmitted together with this request into the RAM 203 in step S2022, which will be described below, and keeps holding this session ID until the E-mail transmission is started in step S4015 illustrated in FIG. 16. Therefore, the session ID is not left in the RAM 203 in an initial status and after a job for the E-mail transmission is submitted (the session ID in the RAM 203 is cleared in, for example, step S4016 illustrated in FIG. 16). Therefore, in step S2015, the CPU 201 determines whether the received request is the request received first based whether there is a session ID in the RAM 203.

Then, if no session ID is stored in the RAM 203 and the CPU 201 determines that the received request is the request received first (YES in step S2015), the processing proceeds to step S2017.

If the CPU 201 determines that the received request is not the request received first (NO in step S2015), the processing proceeds to step S2016. In step S2016, the CPU 201 determines whether the session ID contained in the received request is the same as the session ID stored in the RAM 203 (the session ID stored in step S2022, which will be described below). Then, if the CPU 201 determines that this session is not the same session as the request received first (NO in step S2016), the processing proceeds to step S2025. In step S2025, the CPU 201 does not accept the request because this request is a transmission request from a different mobile apparatus from the mobile apparatus that has transmitted the request first, returns an error response to the mobile terminal 101, and then ends the processing according to the present flowchart.

If the CPU 201 determines that this session is the same session as the request received first (YES in step S2016), the processing proceeds to step S2017 to cause the CPU 201 to accept the request.

In step S2017, the CPU 201 performs loop processing from steps S2018 to S2020, which will be described below, as many times as the number of pieces of data contained in the received request (n=1 to the number of pieces of received data).

First, in step S2018, the CPU 201 determines whether data n is the destination. Then, if the CPU 201 determines that the data n is the destination (YES in step S2018), in step S2019, the CPU 201 stores the data n into the RAM 203 as an "additional setting". The destination is additionally set, so that, even when a destination is already set in the destination list 602, this destination is not deleted and the new destination is set in addition thereto. In other words, the user can, for example, add the destination from the mobile terminal 101 after setting the destination from the address book screen 614 of the MFP 102, and add the destination from the mobile terminal 101 any number of times.

If the CPU 201 determines that the data n is data other than the destination (any of the subject, the message body, and the filename in the present exemplary embodiment) (NO in step S2018), in step S2020, the CPU 201 stores the data n as an "overwrite setting" over the same item already stored in the RAM 203.

After the process in the above-described step S2019 or S2020, the CPU 201 increments n and repeats the above-described loop processing until n reaches the number of pieces of received data. Then, after the CPU 201 ends the above-described loop processing, the processing proceeds to step S2021.

In step S2021, the CPU 201 displays the pop-up message indicating that the data, such as the destination, is set from the mobile terminal 101 (for example, 611 illustrated in FIG. 12) on the display 211. Then, in step S2022, the CPU 201 stores the session ID acquired from the above-described request into the RAM 203, and then ends the processing according to the present flowchart.

In other words, if the data is received a plurality of times after the remote login has succeeded, the CPU 201 performs control so as to handle the data received in the second reception and after that in the following manner. If the data has the same session ID as the session ID of the data received first, the CPU 201 sets this data as the data that should be used. If the data has a different session ID from the session ID of the data received first, the CPU 201 does not set this data as the data that should be used.

In the above-described manner, according to the first exemplary embodiment, even in the state before the user locally logs into the MFP 102 using the keyboard login or the like, e.g., for example, in the state where the login screen 701 is displayed, the user can locally log into the MFP 102 by the mobile login and transmit the data, e.g., the destination, only by pressing the button for the destination transmission (445 illustrated in FIG. 8) from the application screen 480 of the mobile terminal 101. Then, the MFP 102 can close the login screen 701 and automatically display the transmission screen 601 with the data such as the destination set thereon on the display 211 of the MFP 102 according to receiving the data transmitted from the above-described mobile terminal 101. In this manner, the present exemplary embodiment enables the user to easily automatically log into the MFP 102 from the mobile terminal 101 and transmit the data from the mobile terminal 101 to the MFP 102.

The first exemplary embodiment has been described as the exemplary embodiment in which the data, such as the destination of the E-mail, is transmitted from the mobile terminal 101 to the MFP 102. In the following description, the second exemplary embodiment will be described as an exemplary embodiment in which the print data is transmitted from the mobile terminal 101 to the MFP 102, with reference to FIGS. 18, 19, and 20.

<Print Function Screen of Mobile Terminal 101>

Figure 18:
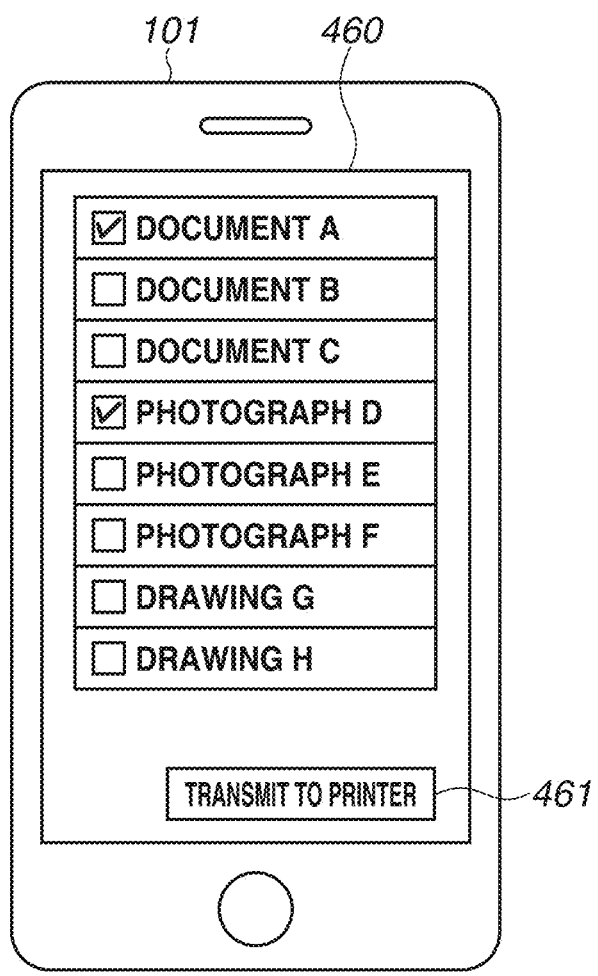
FIG. 18 illustrates an example of a print screen of the mobile terminal.

FIG. 18 illustrates one example of the print screen used for the user to select the print data, e.g., for example, a Portable Document Format (PDF) document, stored in the flash memory 310 and instructing the mobile terminal 101 to transmit the selected print data to the MFP 102 from the screen of the mobile terminal 101. When the function selection button 402 is pressed on the mobile application menu screen 406 illustrated in FIG. 6, this print screen is displayed by the mobile terminal 101.

On the print screen illustrated in FIG. 18, a print data list is displayed in an area 460, and the area 460 includes a check box used for the user to select the print data. The print data selected by the user is controlled by the mobile terminal 101 in such a manner that the check box corresponding thereto is checked. When the user presses a "transmit to printer" button 461, the mobile terminal 101 performs processing for transmitting the print data selected by the user in the print data list 460 to the MFP 102 (which will be described below with reference to FIG. 19 (19A and 19B)). Upon completing the data transmission to the MFP 102, the mobile terminal 101 returns the screen to the mobile application menu screen 406 illustrated in FIG. 6. If the data transmission has failed, the mobile terminal 101 displays an error and maintains the selection state in the print data list 460 without changing it.

<Flow of Print Function on Mobile Terminal 101 Side>

Figure 19B:
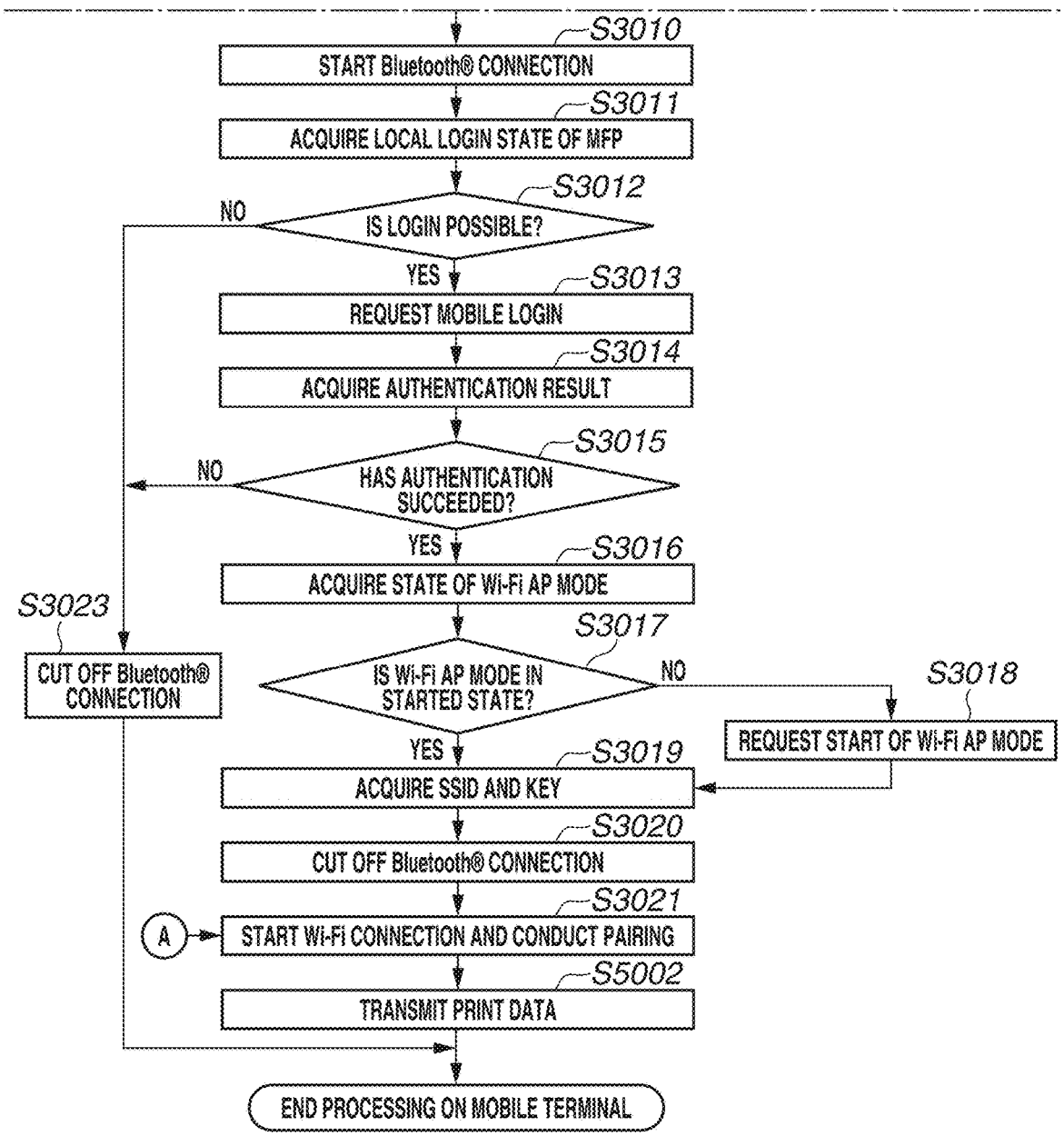
FIGS. 19 (19A and 19B) is a flowchart illustrating an example of processing of a print function on the mobile terminal side.

FIG. 19 (19A and 19B) is a flowchart illustrating one example of processing of the print data transmission function on the mobile terminal 101 according to the second exemplary embodiment. The CPU 307 executes the application 900 under the control by the platform 902, by which a series of processes illustrated in the flowchart of FIG. 19 (19A and 19B) is realized. Further, similar steps to FIG. 14 (14A and 14B) will be identified by the same step numbers, and descriptions thereof will be omitted below. In the following description, processing performed by the application 900 executed by the CPU 307 will be described assuming that the application 900 serves as a performer thereof. Further, processing performed by the platform 902 executed by the CPU 307 will be described assuming that the platform 902 serves as a performer thereof.

In step S5000, upon detecting an input to select the print data on the print function screen (FIG. 18) displayed on the operation panel 301, the application 900 stores the selected list data into the RAM 309.

Next, in step S5001, the application 900 detects that the button 461 for transmitting the data to the printer is pressed on the operation panel 301. Upon this detection, the processing proceeds to step S3002. Steps S3002 to S3024 are similar to FIG. 14 (14A and 14B), and therefore descriptions thereof will be omitted here.

In step S3021, the application 900 completes the Wi-Fi® connection and the pairing with the MFP 102. Upon this completion, the processing proceeds to step S5002.

In step S5002, the application 900 remotely logs into the MFP 102 using the wireless LAN I/F 311, i.e., via the Wi-Fi® communication, reads out the print data contained in the selected list data regarding the print data that has been stored into the RAM 309 in the above-described step, step S5000 from the flash memory 310, and transmits the read print data to the MFP 102. Then, the application 900 ends the processing according to the present flowchart. Details of the process performed in step S5002 is a process according to the detailed flowchart illustrating the process performed in step S3022 illustrated in FIG. 15 in which the data regarding the E-mail, such as the destination, the subject, the message body, and the filename, is replaced with the print data contained in the selected list data regarding the print data that has been stored into the RAM 309 in the above-described step S5000, and therefore a description thereof will be omitted here.

In other words, the application 900 according to the second exemplary embodiment performs control so as to log into the MFP 102 by the mobile login (step S3013) according to detecting that the button 461 for transmitting the data to the printer is pressed (step S5001), and transmit the print data to the MFP 102 using the Wi-Fi® communication (step S5002) based on the success in this mobile login without receiving an instruction to transmit the print data from the user after the success in the mobile login.

<Flow of Print Function on MFP 102 Side>

Figure 20:
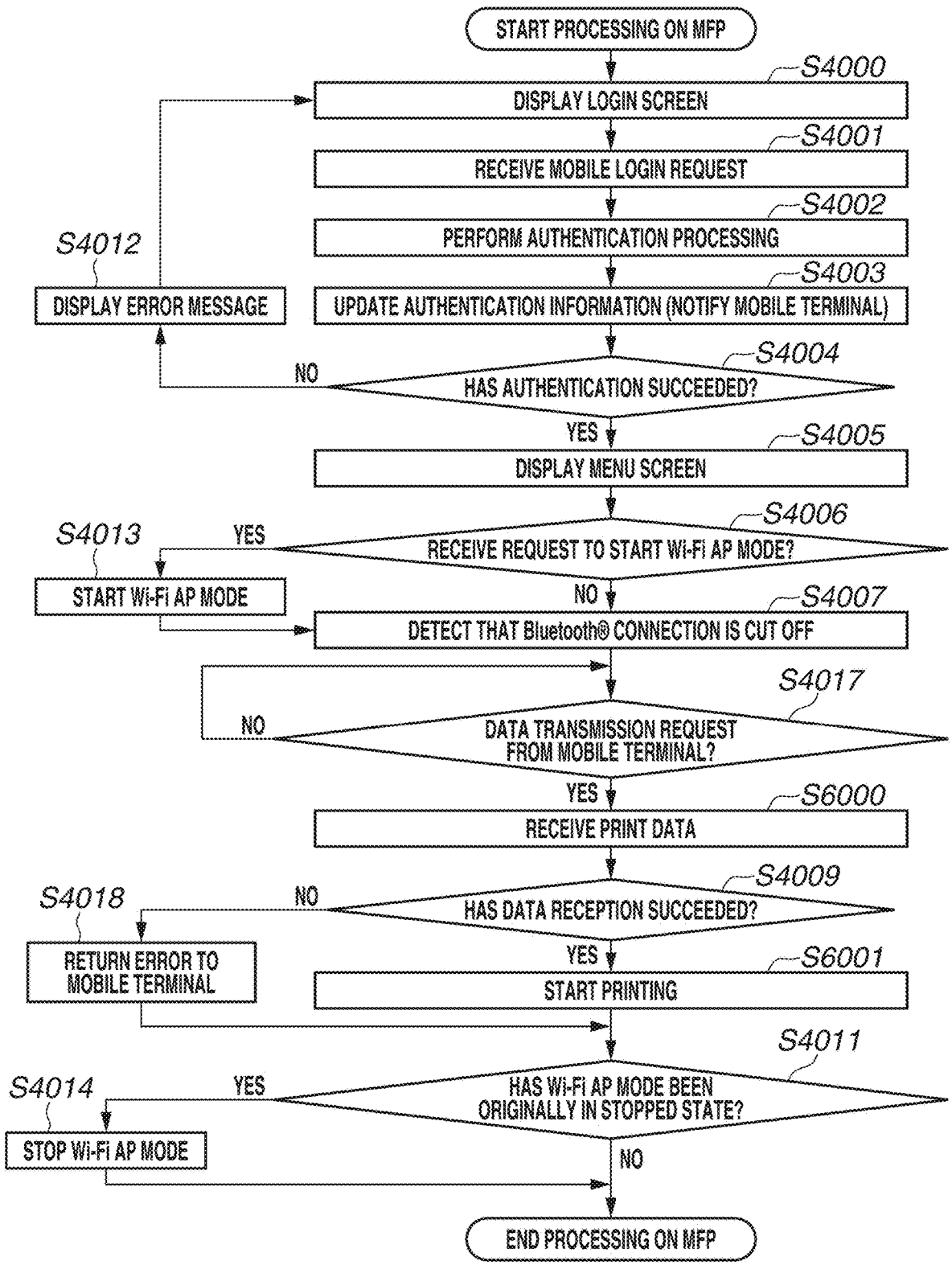
FIG. 20 is a flowchart illustrating an example of processing of the print function on the MFP side.

FIG. 20 is a flowchart illustrating one example of processing on the MFP 102 side when the print data transmission function is exerted with the MFP 102 according to the second exemplary embodiment in the state where no one is logged into the MFP 102. The CPU 201 of the MFP 102 executes a program executable by the MFP 102 in which a procedure that will be described below is written after reading out this program from the ROM 202 into the RAM 203, by which a series of processes illustrated in FIG. 20 is realized. Further, similar steps to FIG. 16 will be identified by the same step numbers, and descriptions thereof will be omitted below.

Processes in steps S4000 to S4018 are similar to FIG. 16, and therefore descriptions thereof will be omitted here.

If the CPU 201 determines that the data transmission request is received from the mobile terminal 101 by the wireless LAN I/F 206 or the network I/F 207 in step S4017 (YES in step S4017), the processing proceeds to step S6000.

In step S6000, the CPU 201 receives the print data transmitted from the mobile terminal 101 with use of the wireless LAN I/F 206 or the network I/F 207. Details of the process performed in step S6000 is a process in which the data regarding the E-mail, such as the destination, the subject, the message body, and the filename, is replaced with the print data in the detailed flowchart illustrating the process performed in step S4008 illustrated in FIG. 17, and therefore a description thereof will be omitted here.

If the CPU 201 determines that the processing for receiving the print data in the above-described step S6000 succeeds in step S4009 (YES in step S4009), the processing proceeds to step S6001.

In step S6001, the CPU 201 causes the printer 214 to start processing for printing the print data received in the above-described step S6000. After the CPU 201 performs the process in step S6001, the processing proceeds to step S4011.

In the above-described manner, according to the second exemplary embodiment, even in the state before the user locally logs into the MFP 102 using the keyboard login or the like, e.g., in the state where the login screen 701 is displayed, the user can locally log into the MFP 102 by the mobile login and transmit the data, e.g., the print data, only by pressing the button for transmitting the print data (461 illustrated in FIG. 18) from the application screen of the mobile terminal 101. Then, according to receiving the print data transmitted from the above-described mobile terminal 101, the MFP 102 can close the login screen 701 and automatically print this received print data. In this manner, the present exemplary embodiment enables the user to easily automatically log into the MFP 102 from the mobile terminal 101 and transmit the data from the mobile terminal 101 to the MFP 102.

In each of the above-described exemplary embodiments, the system has been described as being configured to directly connect the mobile terminal 101 and the MFP 102 via the direct Wi-Fi® connection without using the access point 103, and transmit the data, e.g., the destination or the print data, from the mobile terminal 101 to the MFP 102. However, the system can be configured to connect the mobile terminal 101 and the MFP 102 in the Wi-Fi® infrastructure mode via the access point 103, and transmit the data, e.g., the destination or the print data, from the mobile terminal 101 to the MFP 102.

In each of the above-described exemplary embodiments, the mobile terminal 101 has been described as being configured to acquire the information required for the Wi-Fi® direct communication with the MFP 102 (the SSID, the key, and the like) from the MFP 102 using the Bluetooth® Low Energy communication. However, the mobile terminal 101 can be configured in such a manner that the information required for the Wi-Fi® direct communication with the MFP 102 is set in the mobile terminal 101 and stored in the flash memory 310 in advance. The mobile terminal 101 can be configured to acquire the information required for the Wi-Fi® direct communication with the MFP 102 from the MFP 102 using the Bluetooth® Low Energy communication when this information is not set in the mobile terminal 101.

In each of the above-described exemplary embodiments, the system has been described as being configured in such a manner that the user locally logs into the MFP 102 from the mobile terminal 101 via the communication using Bluetooth® in advance, and then remotely logs in via the Wi-Fi® communication to transmit the data from the mobile terminal 101 to the MFP 102. However, the communication used when the user locally logs into the MFP 102 from the mobile terminal 101 is not limited to Bluetooth®. For example, the system can be configured in such a manner that the user locally logs into the MFP 102 from the mobile terminal 101 using other communication methods, such as a short-range wireless communication called Near Field Radio Communication (NFC) and infrared communication such as Infrared Data Association (IrDA).

The apparatus to which the mobile terminal 101 connects and transmits the data is not limited to the MFP 102, and can be any other type of external apparatus, for example, an information processing apparatus such as a personal computer, a car navigation system, or other home electronics.

The above-described exemplary embodiments are configured in such a manner that an information processing apparatus such as the mobile terminal is communicable with an external apparatus such as the MFP using a first wireless communication function suitable for a local login, e.g., the Bluetooth® Low Energy communication function, and a second wireless communication function suitable for data transmission, e.g., the Wi-Fi® communication function. The mobile terminal is configured to log into the MFP using the first wireless communication function and transmit data, e.g., the E-mail address, the print data, or various kinds of setting data including the scan setting and the like, to the MFP using the second wireless communication function based on a success or a failure in this login.

An information processing apparatus such as the MFP is configured communicably with an external apparatus such as the mobile terminal using a first wireless communication function and a second wireless communication function. The MFP is configured to attempt login processing according to a login request from the mobile terminal using the first wireless communication function, conduct status management that shifts a status of the MFP to a status that receives transmission of data from the mobile terminal based on a success or a failure in the login processing, and receives the data from the mobile terminal using the second wireless communication function in the receivable status.

The above-described configurations enable a user to collectively achieve the local login to the MFP, e.g., step S3013 illustrated in FIG. 14 (14A and 14B), and the data transmission, e.g., step S3022 illustrated in FIG. 14 (14A and 14B) or step S5002 illustrated in FIG. 19 (19A and 19B), only by issuing an instruction to transmit the data on the mobile terminal, e.g., only by pressing the button 445 illustrated in FIG. 8 or the button 461 illustrated in FIG. 18. In other words, even when the user does not yet locally log into the MFP, the user no longer has to engage in a cumbersome operation, such as manually locally logging into the MFP in advance and then operating the mobile terminal to transmit the data to the MFP, unlike the conventional technique. Therefore, it is possible to construct a user-friendly system that enables the user to easily transmit the data from the mobile terminal to the MFP.

The structures of the above-described various kinds of data and the contents thereof are not limited thereto, and these pieces of data can be structured so as to have various structures and/or various contents according to an intended use and purpose.

Having described one type of exemplary embodiment, additional exemplary embodiments can be directed towards, for example, a system, an apparatus, a method, a program, or a storage medium. More specifically, exemplary embodiments can be applied to a system constituted by a plurality of devices, or can be applied to an apparatus constituted by a single device.

All possible configurations constructible by combining the above-described individual exemplary embodiments are also applicable.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The above-described exemplary embodiments are not limiting and can be modified in various manners (including an organic combination of the individual exemplary embodiments), and such modifications are not excluded from the scope of the invention. In other words, all the above-described individual exemplary embodiments and possible configurations constructible by combining modifications thereof are also applicable.

According to the present disclosure, it is possible easily transmit data from an information processing apparatus to an external apparatus using a suitable wireless communication without forcing a user to be bothered with a cumbersome operation.

While exemplary embodiments have been described, it is to be understood that the invention is not limited to the disclosed exemplary embodiments. The scope of the following claims is to be accorded the broadest interpretation so as to encompass all such modifications and equivalent structures and functions.

What is claimed is:

1. An image processing system comprising:
an image processing apparatus; and
an information terminal,
wherein the information terminal comprises:
a first short range wireless communicator that transmits information relating to authentication to the image processing apparatus by short-range wireless communication,
wherein the first short range wireless communicator receives, from the image processing apparatus by the short-range wireless communication, connection information for communicating with the image processing apparatus by wireless communication different from the short-range wireless communication; and
a first wireless communicator that transmits, by the wireless communication established using the connection information, setting information of a transmission function included in the image processing apparatus to the image processing apparatus, and wherein the image processing apparatus comprises:

a second short range wireless communicator that receives the information relating to the authentication from the information terminal by the short-range wireless communication, a controller that causes a user to log-in to the image processing apparatus according to success of authentication using the received information, wherein the second short range wireless communicator transmits the connection information for carrying out the wireless communication if the authentication using the received information is successful;

a second wireless communicator that receives the setting information of the transmission function from the information terminal by the established wireless communication; and a display that displays, according to receipt of the setting information of the transmission function, a transmission setting screen in which the received setting information is set.

2. An information terminal comprising:

a short range wireless communicator that transmits information relating to authentication to an image processing apparatus by short-range wireless communication, wherein the short range wireless communicator receives, from the image processing apparatus by the short-range wireless communication, connection information for communicating with the image processing apparatus by wireless communication different from the short-range wireless communication; and a wireless communicator that transmits, by the wireless communication established using the connection information, setting information of a transmission function included in the image processing apparatus to the image processing apparatus, wherein the image processing apparatus receives the setting information of the transmission function from the information terminal by the established wireless communication, and the image processing apparatus displays, according to receipt of the setting information of the transmission function, a transmission setting screen in which the received setting information is set.

3. The information terminal according to claim 2, wherein the short-range wireless communication is communication using Bluetooth® Low Energy, and wherein the short range wireless communicator transmits the information using a GATT (Generic Attribute) communication method of Bluetooth® Low Energy.

4. The information terminal according to claim 3, wherein the short range wireless communicator receives signals periodically transmitted from the image processing apparatus by the short-range wireless communication, and wherein the wireless communicator estimates a distance between the image processing apparatus and the information terminal based on a strength of a radio wave of each of the received signals, wherein the information relating to the authentication is transmitted to the image processing apparatus based on an estimation that the distance is less than a predetermined distance.

5. The information terminal according to claim 2, wherein the image processing apparatus performs the transmission function based on the setting information set in the transmission setting screen.

6. The information terminal according to claim 2, wherein the wireless communication is communication using Wi-Fi®, and, wherein the setting information is transmitted to the image processing apparatus via an access point to which the image processing apparatus is connected by the wireless communication.

7. The information terminal according to claim 2, wherein the wireless communication is communication using Wi-Fi®, and, wherein the setting information is transmitted to the image processing apparatus via an access point for direct wireless communication that the image processing apparatus includes.

8. The information terminal according to claim 7, wherein, upon condition that the access point for the direct wireless communication that the image processing apparatus includes is stopped, a request for enabling the access point for the direct wireless communication is transmitted, and the setting information is transmitted to the image processing apparatus via the access point for the direct wireless communication after the access point is activated.

9. The information terminal according to claim 2, further comprising:

a user interface that receives an instruction from a user, wherein the information relating to the authentication is transmitted to the image processing apparatus according to reception of an instruction for transmitting the setting information to the image processing apparatus.

10. The information terminal according to claim 2, wherein the setting information includes destination information, and wherein the image processing apparatus receives the setting information including the destination information and displays the transmission setting screen in which the received destination information is set.

11. An image processing apparatus comprising:

a short range wireless communicator that receives information relating to authentication from an information terminal by short-range wireless communication, a controller that causes a user to log-in to the image processing apparatus according to success of authentication using the received information, wherein the short range wireless communicator transmits connection information for carrying out wireless communication if the authentication using the received information is successful, and wherein the information terminal transmits, by the wireless communication established using the connection information, setting information of a transmission function included in the image processing apparatus to the image processing apparatus;

a wireless communicator that receives the setting information of the transmission function from the information terminal by the established wireless communication; and a display that displays, according to receipt of the setting information of the transmission function, a transmission setting screen in which the received setting information is set.

12. The image processing apparatus according to claim 11,
wherein the short-range wireless communication is communication using Bluetooth® Low Energy, and
wherein the information terminal transmits the information using a GATT (Generic Attribute) communication method of Bluetooth® Low Energy.

13. The image processing apparatus according to claim 12,
wherein the information terminal receives signals periodically transmitted from the image processing apparatus by the short-range wireless communication and estimates a distance between the image processing apparatus and the information terminal based on a strength of a radio wave of each of the received signals,
wherein the information relating to the authentication is transmitted to the image processing apparatus based on an estimation that the distance is less than a predetermined distance.

14. The image processing apparatus according to claim 11,
wherein the controller performs the transmission function based on the setting information set in the transmission setting screen.

15. The image processing apparatus according to claim 11,
wherein the wireless communication is communication using Wi-Fi®, and
wherein the setting information is transmitted to the image processing apparatus via an access point to which the image processing apparatus is connected by the wireless communication.

16. The image processing apparatus according to claim 11,
wherein the wireless communication is communication using Wi-Fi®, and
wherein the setting information is transmitted to the image processing apparatus via an access point for direct wireless communication that the image processing apparatus includes.

17. The image processing apparatus according to claim 16,
wherein, upon condition that the access point for the direct wireless communication that the image processing apparatus includes is stopped, a request for enabling the access point for the direct wireless communication is transmitted, and the setting information is transmitted to the image processing apparatus via the access point for the direct wireless communication after the access point is activated.

18. The image processing apparatus according to claim 11,
wherein the information terminal receives an instruction from a user, and
wherein the information relating to the authentication is transmitted to the image processing apparatus according to reception of an instruction for transmitting the setting information to the image processing apparatus.

19. The information terminal according to claim 11,
wherein the setting information includes destination information, and
wherein the image processing apparatus receives the setting information including the destination information and displays the transmission setting screen in which the received destination information is set.

20. An image processing system comprising:
an image processing apparatus; and
an information terminal to carry out short-range wireless communication using Bluetooth® Low Energy and wireless communication using Wi-Fi®,
wherein the information terminal comprising:
a first short range wireless communicator that transmits information relating to authentication to the image processing apparatus by the short-range wireless communication, wherein the first short range wireless communicator receives, from the image processing apparatus by the short-range wireless communication, connection information for communicating with the image processing apparatus by the wireless communication, and
a first wireless communicator that transmits, by the wireless communication established using the connection information, setting information of a transmission function included in the image processing apparatus to the image processing apparatus, and
wherein the image processing apparatus comprising;
a second short range wireless communicator that receives the information relating to the authentication from the information terminal by the short-range wireless communication,
a controller that causes a user to log-in to the image processing apparatus according to success of authentication using the received information, wherein the second short range wireless communicator transmits the connection information for carrying out the wireless communication if the authentication using the received information is successful;
a second wireless communicator that receives the setting information of the transmission function from the information terminal by the established wireless communication; and
a display that displays, according to receipt of the setting information of the transmission function, a transmission setting screen in which the received setting information is set.

21. An information terminal comprising:
a short range wireless communicator that transmits information relating to authentication to an image processing apparatus by short-range wireless communication using Bluetooth® Low Energy,
wherein the image processing apparatus receives the information relating to the authentication from the information terminal by the short-range wireless communication, the image processing apparatus causes a user to log-in to the image processing apparatus according to success of authentication using the received information, the image processing apparatus transmits connection information for establishing a connection for carrying out wireless communication using Wi-Fi® if the authentication using the received information is successful, and
wherein the short range wireless communicator receives, from the image processing apparatus using Bluetooth® Low Energy, connection information for communicating with the image processing apparatus by the wireless communication; and
a wireless communicator that transmits, by the wireless communication established using the connection information, setting information of a transmission function included in the image processing apparatus to the image processing apparatus,
wherein the image processing apparatus receives the setting information of the transmission function from the information terminal by the established wireless communication, and the image processing apparatus displays, according to receipt of the setting information of the transmission function, a transmission setting screen in which the received setting information is set.

22. An image processing apparatus comprising:
a short range wireless communicator that receives information relating to authentication from an information terminal by short-range wireless communication using Bluetooth® Low Energy,
a controller that causes a user to log-in to the image processing apparatus according to success of authentication using the received information, wherein the short range wireless communicator transmits connection information for carrying out wireless communication using Wi-Fi® if the authentication using the received information is successful,
wherein the information terminal transmits, by the wireless communication established using the connection information, setting information of a transmission function included in the image processing apparatus to the image processing apparatus,
a wireless communicator that receives the setting information of the transmission function from the information terminal by the established wireless communication, and
a display that displays, according to receipt of the setting information of the transmission function, a transmission setting screen in which the received setting information is set.

23. A method for controlling an information apparatus and an image processing apparatus comprising:
transmitting information relating to authentication to the image processing apparatus by short-range wireless communication,
receiving the information relating to the authentication from the information terminal by the short-range wireless communication,
causing a user to log-in to the image processing apparatus according to success of authentication using the received information,
transmitting the connection information for carrying out the wireless communication if the authentication using the received information is successful,
receiving, from the image processing apparatus by the short-range wireless communication, connection information for communicating with the image processing apparatus by wireless communication different from the short-range wireless communication,
transmitting by the wireless communication established using the connection information, setting information of a transmission function included in the image processing apparatus to the image processing apparatus
receiving the setting information of the transmission function from the information terminal by the established wireless communication, and
displaying, according to receipt of the setting information of the transmission function, a transmission setting screen in which the received setting information is set.

24. A method for controlling an information apparatus and an image processing apparatus comprising:
transmitting information relating to authentication to the image processing apparatus by the short-range wireless communication,
receiving the information relating to the authentication from the information terminal by the short-range wireless communication,
causing a user to log-in to the image processing apparatus according to success of authentication using the received information,
transmitting the connection information for carrying out the wireless communication if the authentication using the received information is successful,
receiving, from the image processing apparatus by the short-range wireless communication, connection information for communicating with the image processing apparatus by the wireless communication,
transmitting, by the wireless communication established using the connection information, setting information of a transmission function included in the image processing apparatus to the image processing apparatus,
receiving the setting information of the transmission function from the information terminal by the established wireless communication, and
displaying, according to receipt of the setting information of the transmission function, a transmission setting screen in which the received setting information is set.

* * * * *